United States Patent
Han et al.

(10) Patent No.: US 10,722,065 B2
(45) Date of Patent: Jul. 28, 2020

(54) APPARATUS AND METHOD OF MULTI-COURSE INFUSION FOR BREWING TEA AND OTHER BEVERAGES

(71) Applicant: Adagio Teas, Inc., Elmwood Park, NJ (US)

(72) Inventors: Allen M. Han, Mountain View, CA (US); Kris Richard Efland, Redwood City, CA (US); Jean-Francois Merlet, Santa Cruz, CA (US)

( * ) Notice: Subject to any disclaimer, the term of this patent is extended or adjusted under 35 U.S.C. 154(b) by 511 days.

(21) Appl. No.: 15/055,452

(22) Filed: Feb. 26, 2016

(65) Prior Publication Data
US 2017/0156539 A1 Jun. 8, 2017

Related U.S. Application Data

(63) Continuation-in-part of application No. 14/863,338, filed on Sep. 23, 2015, which is a continuation of application No. 14/340,520, filed on Jul. 24, 2014.

(60) Provisional application No. 62/126,309, filed on Feb. 27, 2015.

(51) Int. Cl.
*A47J 31/00* (2006.01)
*G06F 3/0484* (2013.01)

(52) U.S. Cl.
CPC .................... *A47J 31/002* (2013.01)

(58) Field of Classification Search
None
See application file for complete search history.

(56) References Cited

U.S. PATENT DOCUMENTS

| | | | | |
|---|---|---|---|---|
| 3,793,933 A | * | 2/1974 | Weber | A47J 31/0573 99/283 |
| 3,941,042 A | * | 3/1976 | Wells | A47J 31/057 99/289 R |
| 4,204,465 A | * | 3/1980 | Knecht | A47J 31/30 99/293 |
| 5,503,060 A | | 4/1996 | Morecroft et al. | |
| 5,694,115 A | | 12/1997 | Desatoff | |

(Continued)

FOREIGN PATENT DOCUMENTS

EP 1338231 A1 8/2003

OTHER PUBLICATIONS

International Search Report and Written opinion issued to international patent application No. PCT/US2017/031248, dated Jul. 17, 2017, 6 pgs.

(Continued)

*Primary Examiner* — Ibrahime A Abraham
*Assistant Examiner* — Gyounghyun Bae
(74) *Attorney, Agent, or Firm* — Matthew M. Googe; Robinson IP Law, PLLC

(57) ABSTRACT

A server has a processor a memory connected to the processor. The memory stores instructions executed by the processor to maintain a recipe database including a genus characterization of an infusible material and species of infusible materials within the genus characterization. Each species of infusible material has an associated recipe specifying infusible material course treatments. Each infusible material course treatment includes at least one set of fluid agitation parameters, at least one wait interval, at least on set of liquid injection parameters and a release parameter.

14 Claims, 29 Drawing Sheets

(56) References Cited

U.S. PATENT DOCUMENTS

| | | | |
|---|---|---|---|
| 6,250,208 B1* | 6/2001 | Helps | A47J 31/0615 99/279 |
| 6,405,637 B1 | 6/2002 | Cai | |
| 6,502,501 B1* | 1/2003 | Simon | A47J 27/04 99/345 |
| 6,575,081 B2* | 6/2003 | Kanba | A47J 31/0605 99/299 |
| 7,856,919 B2* | 12/2010 | Van Belleghem | A47J 31/0642 99/286 |
| 7,879,381 B2* | 2/2011 | Dow | A47J 36/00 426/523 |
| 8,484,142 B2* | 7/2013 | Pinckney | G06F 17/30867 706/12 |
| 8,606,396 B2* | 12/2013 | Claesson | B67D 1/0021 222/145.6 |
| 8,666,909 B2* | 3/2014 | Pinckney | G06Q 30/02 706/11 |
| 8,725,667 B2* | 5/2014 | Kaushal | G05B 13/0265 706/14 |
| 8,746,507 B2* | 6/2014 | Metropulos | B67D 1/0888 222/129.1 |
| 8,755,932 B2* | 6/2014 | Peters | B67D 1/0041 700/233 |
| 8,899,280 B2* | 12/2014 | Deo | B67D 1/0888 141/94 |
| 8,910,564 B2* | 12/2014 | Glucksman | A47J 31/32 99/302 R |
| 9,009,096 B2* | 4/2015 | Pinckney | G06F 17/30867 706/52 |
| 9,808,114 B1* | 11/2017 | Heys | A47J 31/46 |
| 2005/0120886 A1 | 6/2005 | Chen | |
| 2010/0154645 A1* | 6/2010 | Nosler | A47J 31/007 99/281 |
| 2011/0212236 A1 | 9/2011 | Nguyen et al. | |
| 2011/0259472 A1 | 10/2011 | Clark et al. | |
| 2013/0263745 A1* | 10/2013 | Bombeck | A47J 31/24 99/293 |
| 2014/0255563 A1 | 9/2014 | Rondelli | |
| 2014/0263780 A1 | 9/2014 | Day, Jr. | |
| 2015/0201796 A1* | 7/2015 | Kuempel | A47J 31/5255 426/231 |
| 2016/0022087 A1 | 1/2016 | Han et al. | |

OTHER PUBLICATIONS

International Search Report and Written Opinion issued to international patent application No. PCT/US17/19507, dated May 19, 2017, 9 pgs.

Sinnott, "The Art and Craft of Coffee: An Enthusiast's Guide to Selecting, Roasting, and Brewing Exquisite Coffee", Quarry Books, 2010, 5 pgs.

* cited by examiner not drawn to scale not drawn to scale not drawn to scale not drawn to scale not drawn to scale not drawn to scale not drawn to scale not drawn to scale not drawn to scale not drawn to scale not drawn to scale not drawn to scale

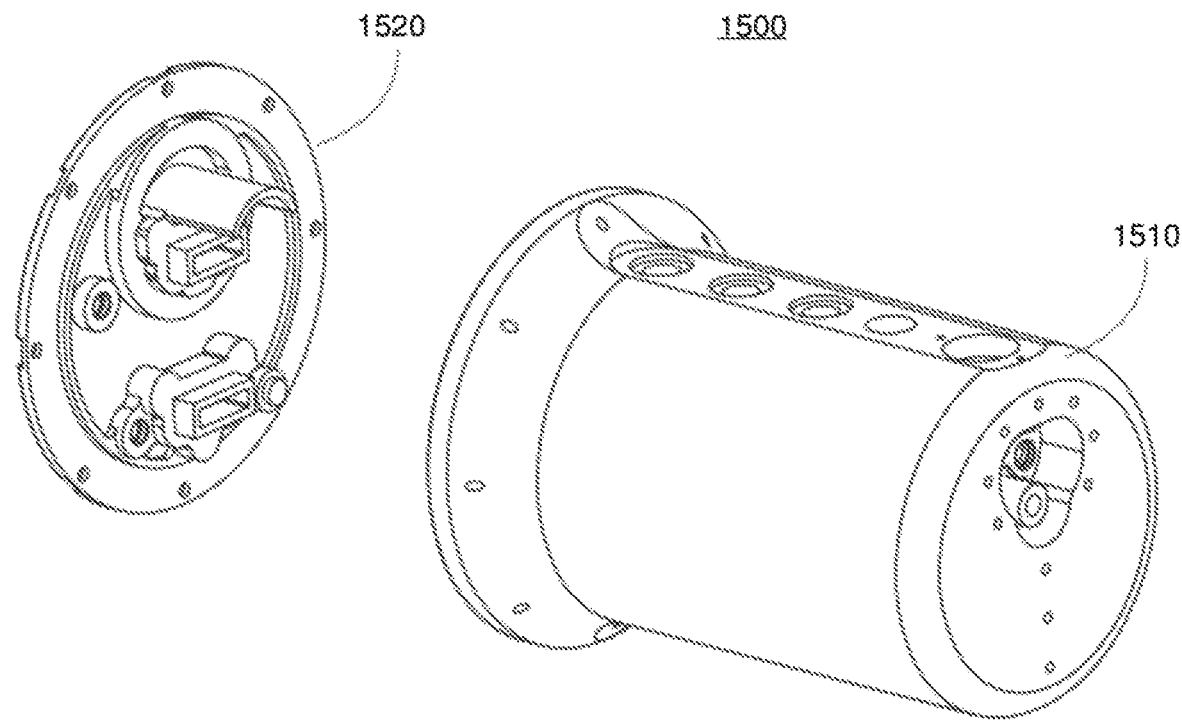
FIG. 15
Orthographic View 1
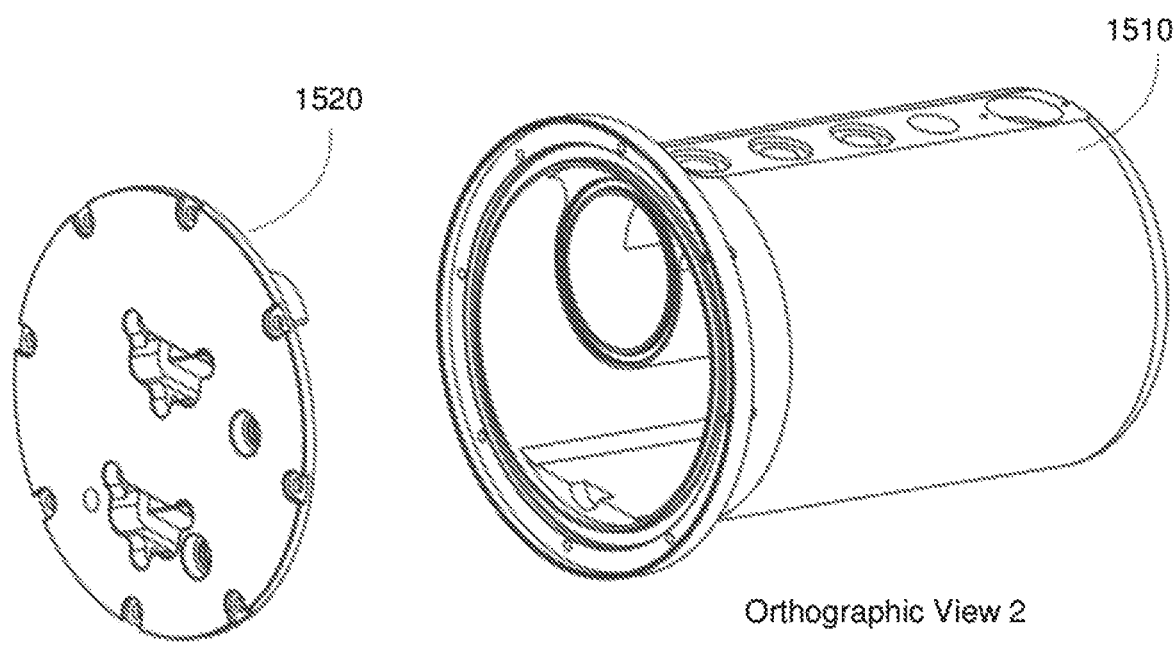
Orthographic View 2

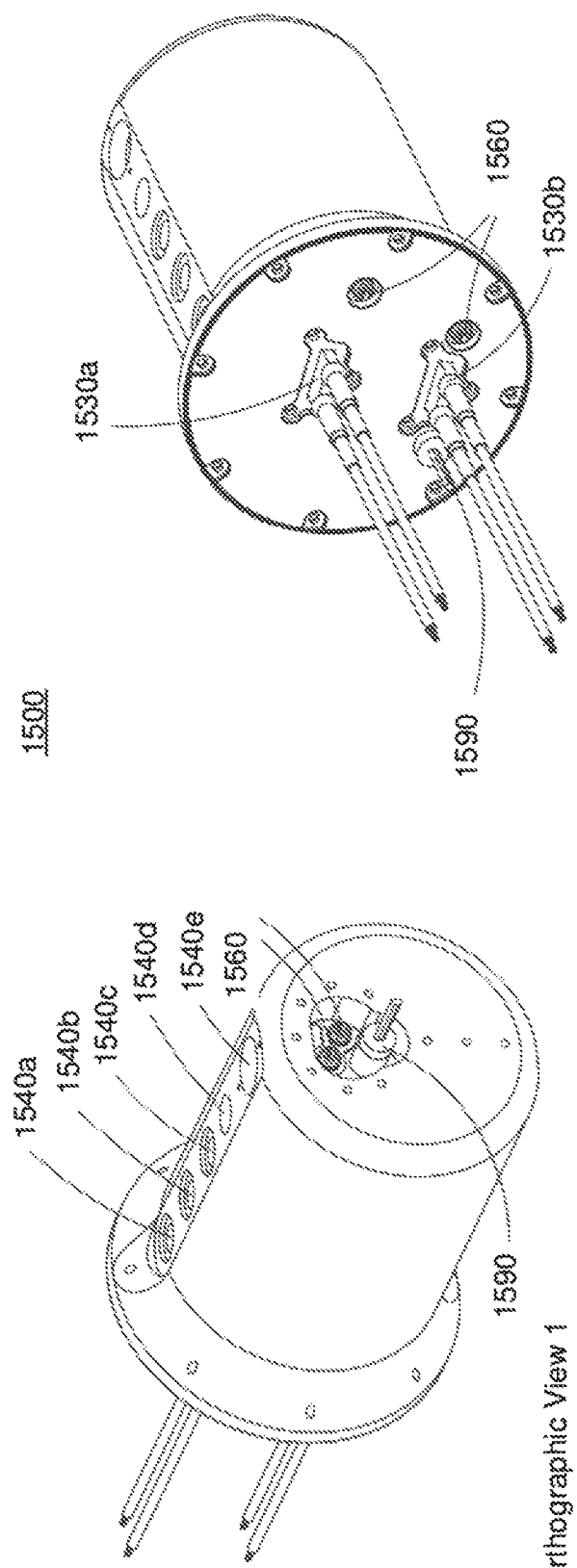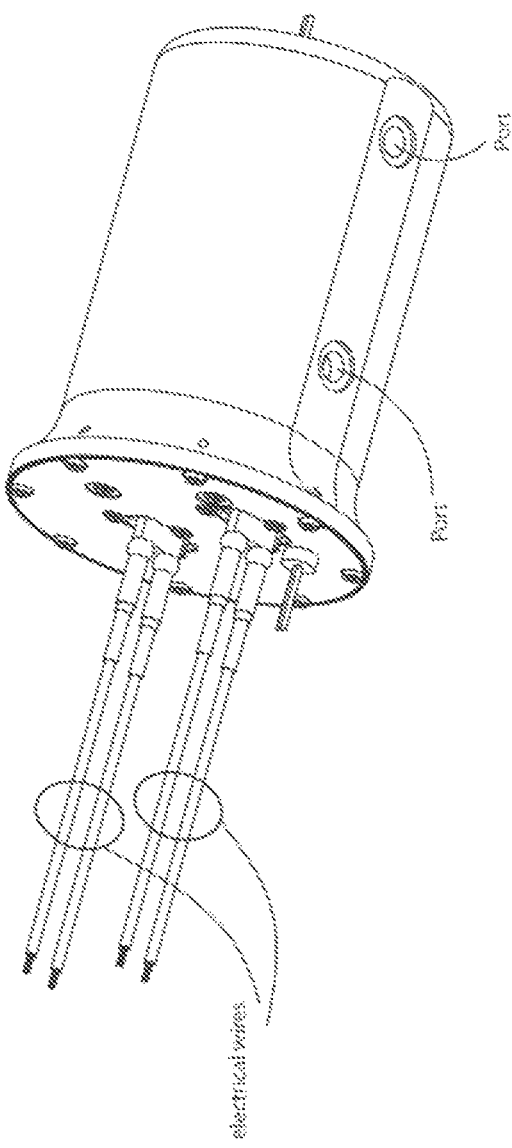
FIG. 17

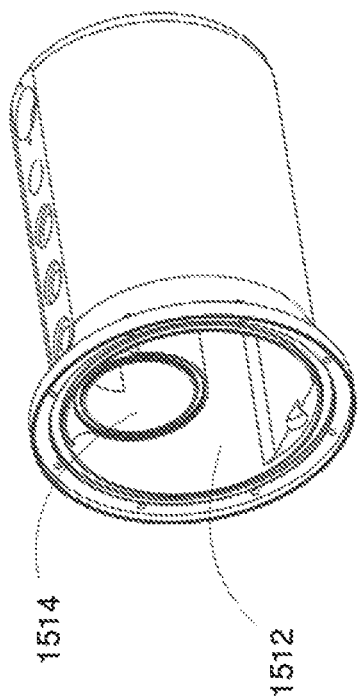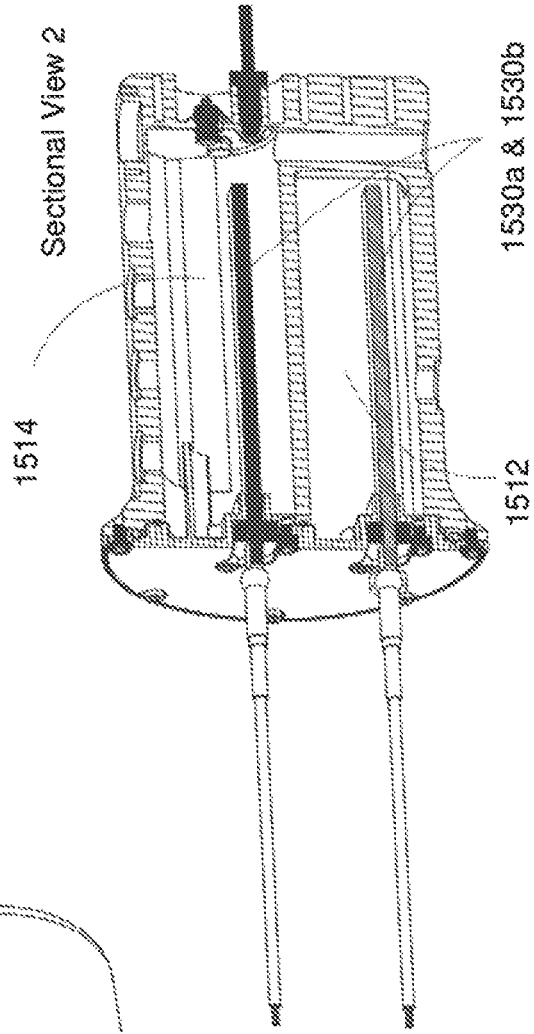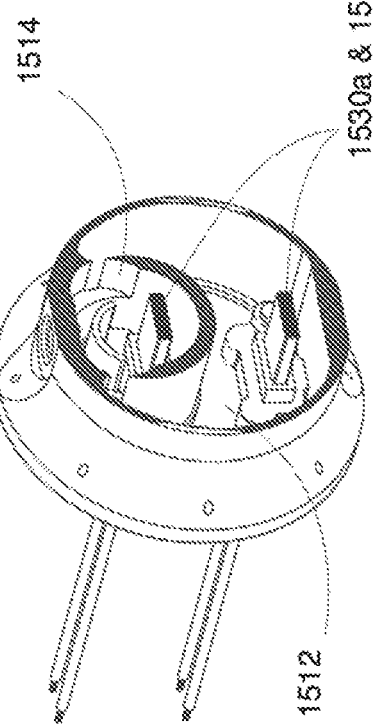
FIG. 18

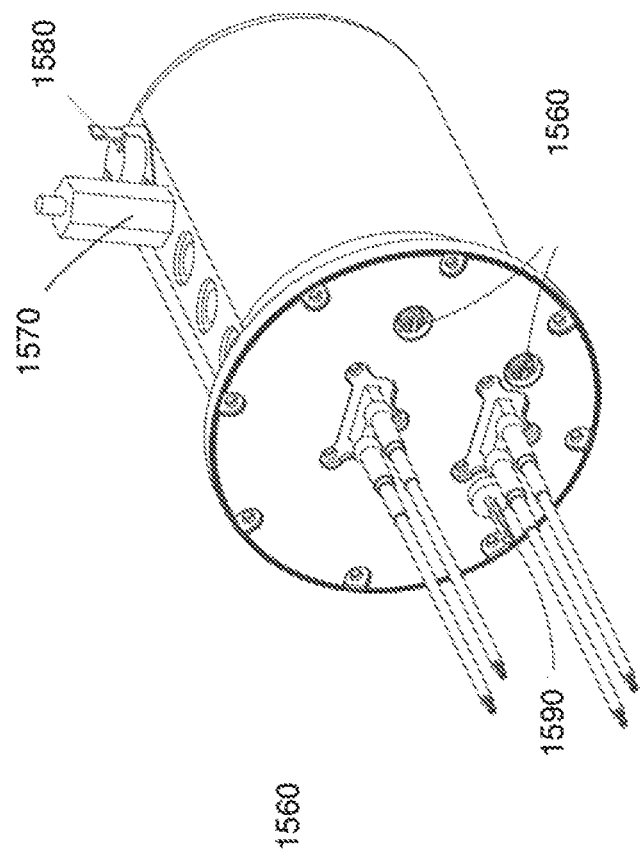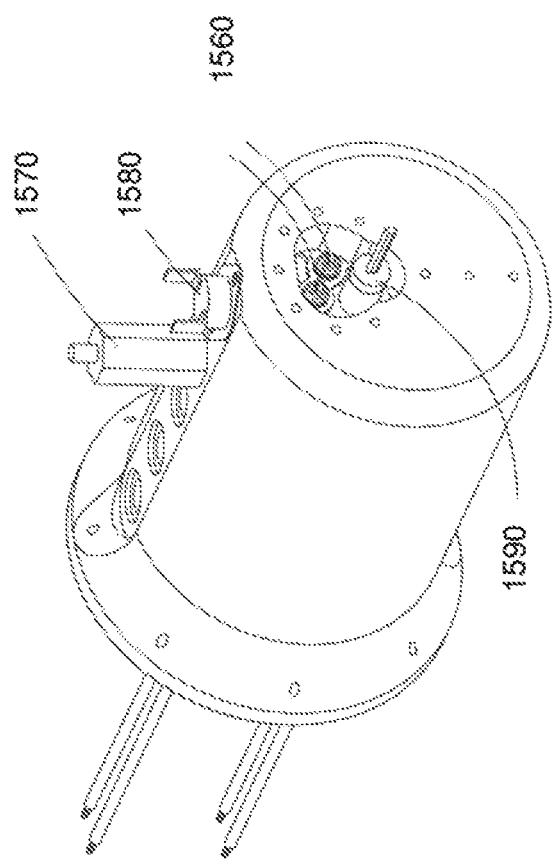
FIG. 20

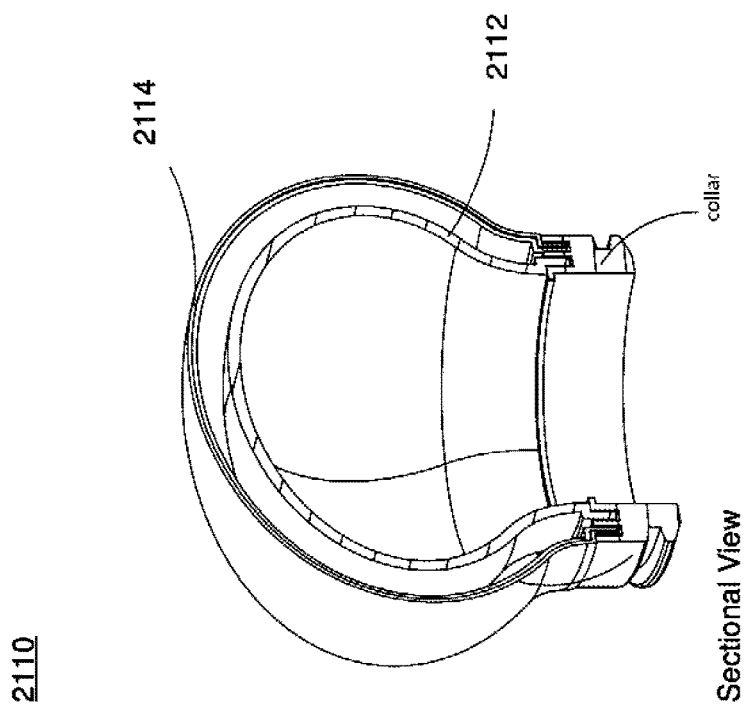
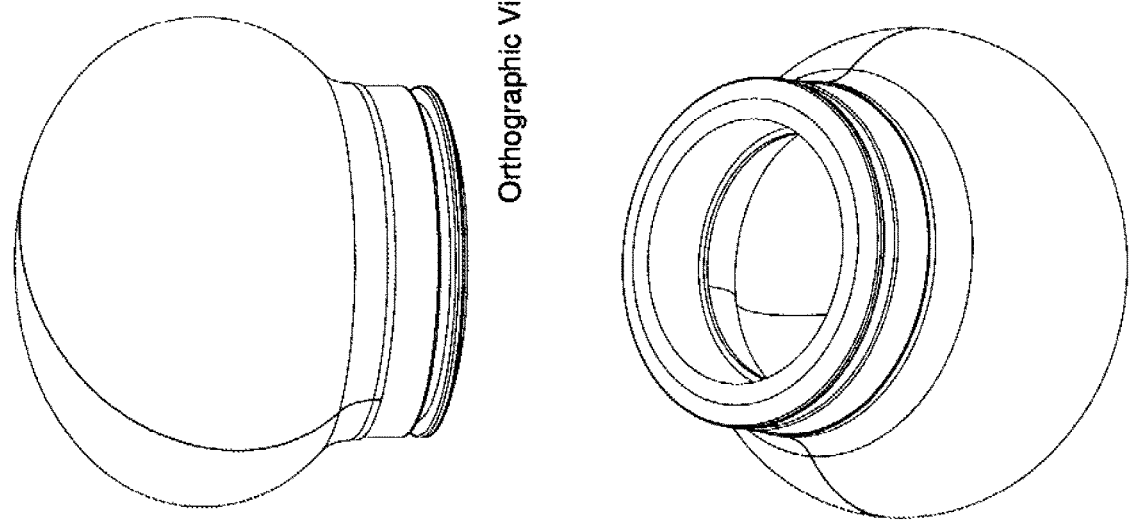
FIG. 22

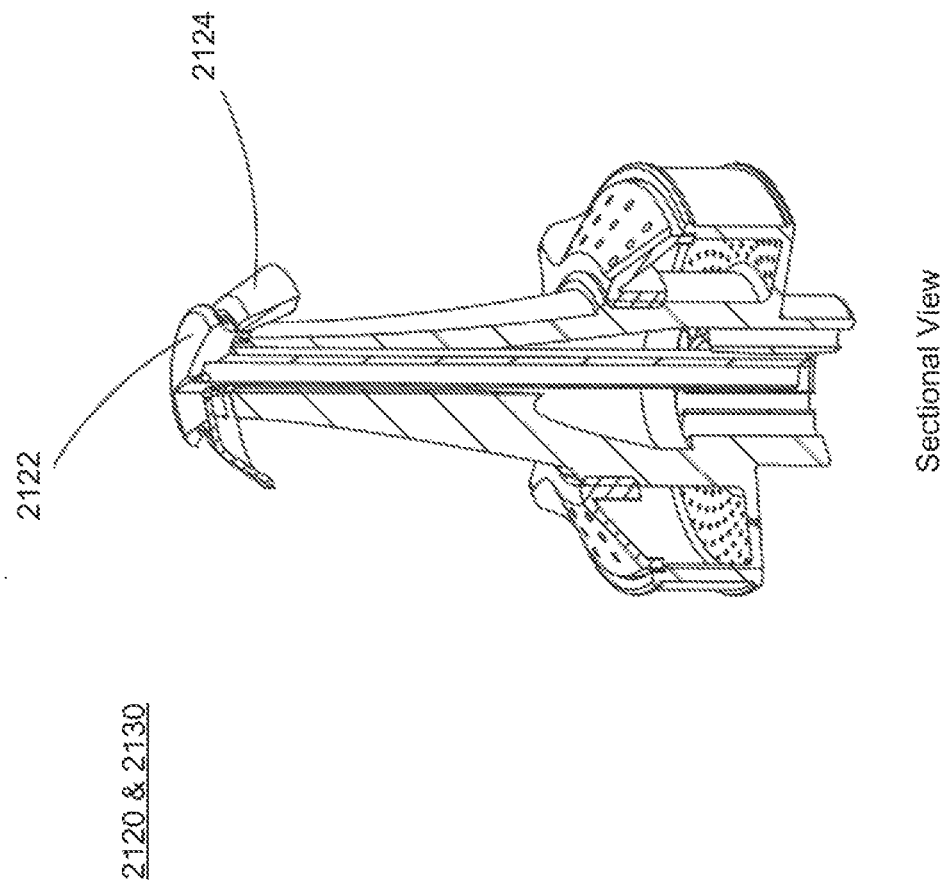
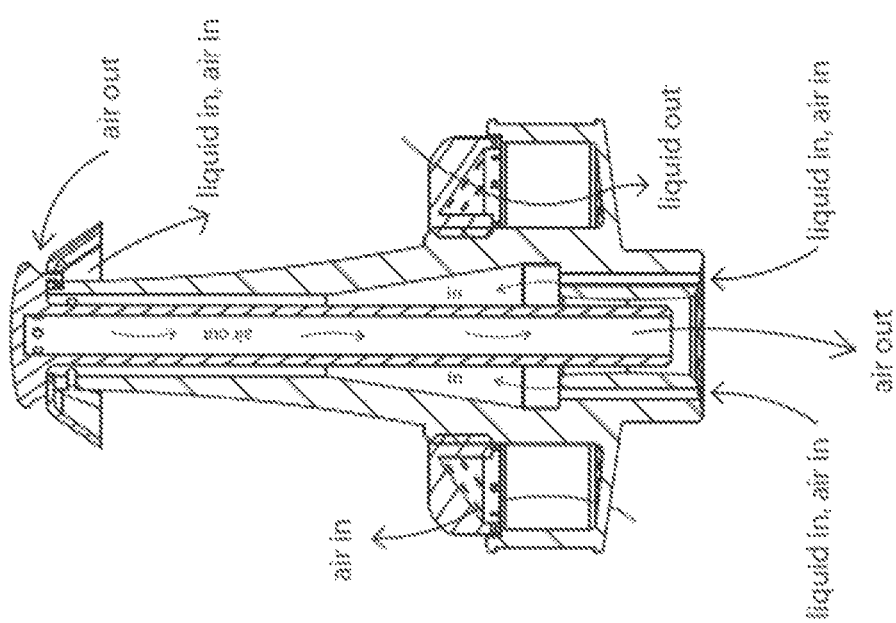
FIG. 23

Genus_1    Species_1 .................... Species_N

•
•
•

Genus_N    Species_1 .................... Species_N
              |
              ↓

Recipe Metadata

Course_1
   Fluid Agitation Parameters
   Wait Interval
   Liquid Injection Parameters
   Wait Interval
   Release Parameter

•
•
•

Course_N
   Liquid Injection Parameters
   Wait Interval
   Fluid Agitation Parameters
   Wait Interval
   Release Parameter

FIG. 26

APPARATUS AND METHOD OF MULTI-COURSE INFUSION FOR BREWING TEA AND OTHER BEVERAGES

CROSS REFERENCE TO RELATED APPLICATIONS

This application is a continuation-in-part of U.S. Ser. No. 14/863,338, filed Sep. 23, 2015, which is a continuation of U.S. patent application Ser. No. 14/340,520 filed on Jul. 24, 2014, the contents of which are incorporated herein by reference. This application also claims priority to U.S. provisional patent application 62/126,309, filed Feb. 27, 2015, the contents of which are incorporated herein by reference.

TECHNICAL FIELD

The present disclosure relates to tea brewing, and more particularly to an apparatus and method of multi-course infusion for brewing tea and other beverages.

BACKGROUND

Research has shown that chemicals in tea are released at different temperatures and at different rates. For example, the aromatic compounds in tea leaves are released into the tea beverage (the infusion of water and tea leaves) within the first 5 to 30 seconds of the tea leaves being bathed in hot water, with temperature of the hot water in the range of 65~100° C. Other compounds that greatly contribute to the taste of the tea beverage are released at a slower rate, thus requiring a longer hot water bath for the release to take place. To make matters more complicated, some important compounds actually start to break down and lose their flavors and potency at different temperatures and times. Mismatched time/temperature equations sometimes cause chemical reactions that form undesirable characteristics in the tea, e.g., bitterness.

Taking Oolong tea as an example, Oolong teas are famous for their aromatic and complex flavors. High quality ball-shaped Oolong teas are historically prepared using only the top two leaves and the bud of the *Camellia sinensis* tea plant. To prepare Oolong tea, one common practice calls for adding 10 grams of tea to 235 ml of hot water at 90° C. for three minutes. However, such method of brewing Oolong tea may risk not bringing out the best of Oolong tea as well as causing undesirable results such as bitterness, for example.

Moreover, in many home or retail settings (e.g., teashop, coffee shop or restaurants), a dose of loose-leaf tea is infused only a single time and often for long periods of time. However, this is not the best combination for optimal brewing.

SUMMARY

A server has a processor a memory connected to the processor. The memory stores instructions executed by the processor to maintain a recipe database including a genus characterization of an infusible material and species of infusible materials within the genus characterization. Each species of infusible material has an associated recipe specifying infusible material course treatments. Each infusible material course treatment includes at least one set of fluid agitation parameters, at least one wait interval, at least on set of liquid injection parameters and a release parameter.

A brewing machine has a network interface processor, a user interface processor coupled to the network interface processor and a mechanical system control processor connected to the user interface processor. The mechanical system control processor is configured to execute a recipe specifying infusible material course treatments. Each infusible material course treatment includes at least one set of fluid agitation parameters, at least one wait interval, at least one set of liquid injection parameters and a release parameter.

BRIEF DESCRIPTION OF THE DRAWINGS

FIG. 15 is a diagram of various views of an assembly of an example water steam hybrid heating chamber (WSHHC) of an apparatus capable of a multi-course infusion method for tea brewing in accordance with an embodiment of the present disclosure.

FIG. 17 is a diagram of various views of the example WSHHC of FIG. 15.

FIG. 18 is a diagram of various views of the example WSHHC of FIG. 15.

FIG. 20 is a diagram of various views of the example WSHHC of FIG. 15.

FIG. 22 is a diagram of various views of a component of the example infusion chamber of FIG. 21.

FIG. 23 is a diagram of various views of a component of the example infusion chamber of FIG. 21.

FIG. 26 illustrates database schema utilized in accordance with an embodiment of the invention.

DETAILED DESCRIPTION OF PREFERRED EMBODIMENTS

Overview

In order to create the ideal tea beverage, embodiments of techniques of the present disclosure extract the essence of tea into beverage by employing a multi-course infusion method. The multi-course infusion method allows fine-granular control in the operational process to highlight (or minimize) different aromatics, flavors and chemical compounds. In particular, the multi-course infusion method is designed to distill a single dose of loose-leaf tea multiple times to produce a better beverage experience. This is because it is very difficult, if not impossible, to reveal the subtle flavors and characteristics of tea in a single infusion.

When multiple infusions are enhanced with the right combination of time and temperature, the true essence of tea is revealed. Thus, methods of preparing tea in accordance with the present disclosure contrast significantly from most traditional tea preparations.

Embodiments of a multi-course infusion method in accordance with the present disclosure are applicable to any beverage medium including tea, tisane, rooibos, mate, coffee and herbal infusions. For simplicity, the description below uses Oolong tea as an example. It would be appreciated that, although described examples in this section may pertain to the preparation of Oolong tea, the scope of the claimed subject matter as well as any variation thereof is not limited thereto as the techniques of the present disclosure are applicable to other beverage mediums.

Example Apparatus and Process

Figure 1:
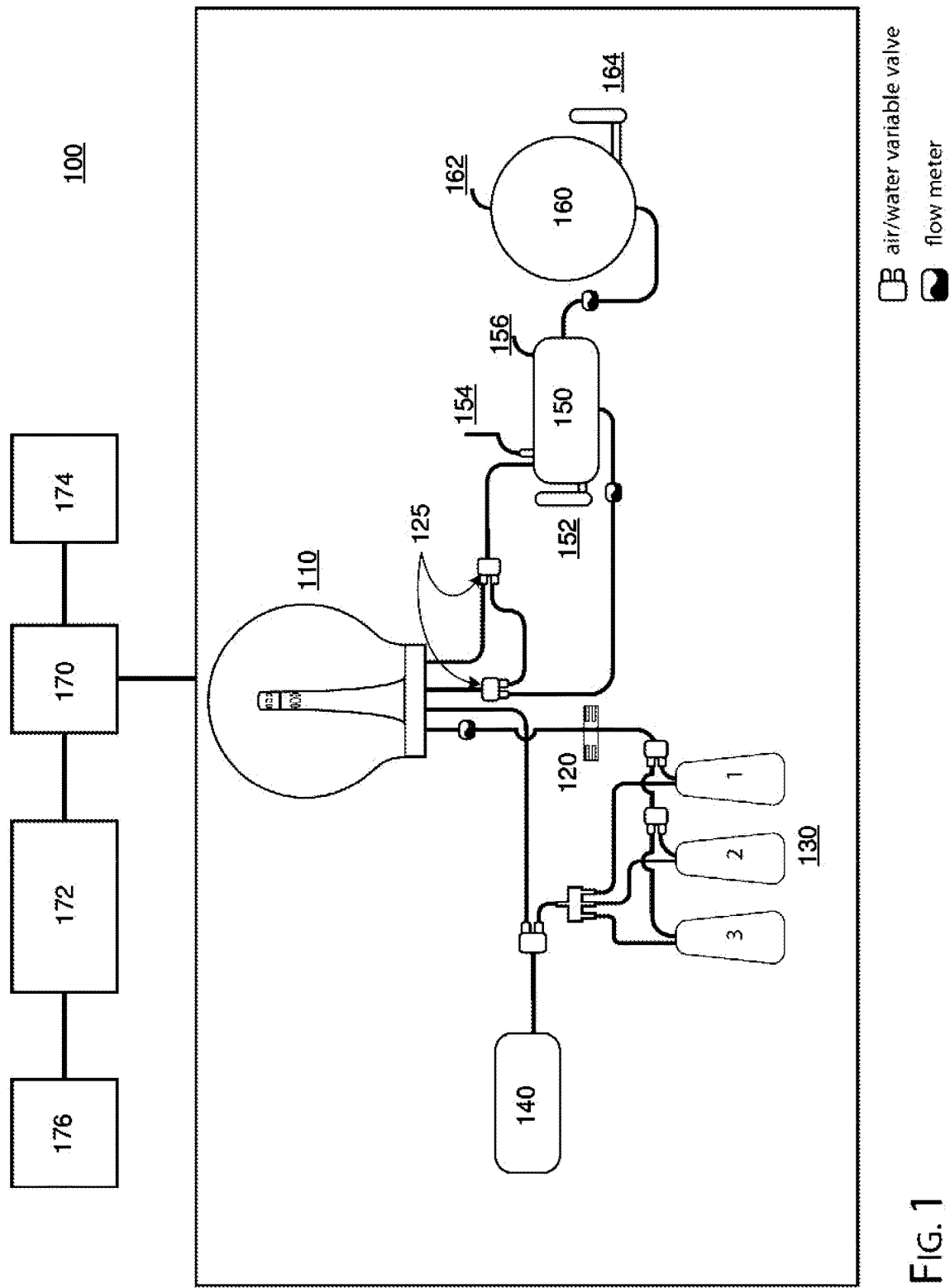
FIG. 1 is a diagram of an example apparatus capable of a multi-course infusion method for tea brewing in accordance with an embodiment of the present disclosure.

FIG. 1 is a diagram of an example apparatus 100 capable of a multi-course infusion method for tea brewing in accordance with an embodiment of the present disclosure. Each of FIGS. 2-12 shows a respective stage of various stages in the multi-course infusion method for tea brewing using example apparatus 100.

As shown in FIG. 1, example apparatus 100 may include a number of components including, but not limited to, the following: infusion chamber 110, variable air valve (herein interchangeably referred to as aerator) 120, air/water variable valves 125, one or more serving carafes 130, air pump/vacuum 140, water steam hybrid heating chamber (WSHHC) 150, water tank 160, processing unit (herein interchangeably referred to as processor or CPU) 170, user interface unit 172, network communication unit 174, and additional control interface 176. The WSHHC 150 may include level sensor 152, pressure relief valve 154 and controlled air intake 156. The water tank 160 may include open air intake 162 and level sensor 164.

As mentioned above, one conventional approach to preparing Oolong tea entails adding 10 grams of tea to 235 ml of hot water at 90° C. for three minutes. In contrast, an example multi-course infusion process using example apparatus 100 for making the same amount (235 ml) of tea beverage in accordance with the present disclosure are described below. It is noteworthy that, even with eight main steps in the multi-course infusion process compared to one in the conventional approach, the multi-course infusion process according to the present disclosure is capable of producing the same amount (235 ml) of tea in two minutes and 50 seconds.

Figure 2:
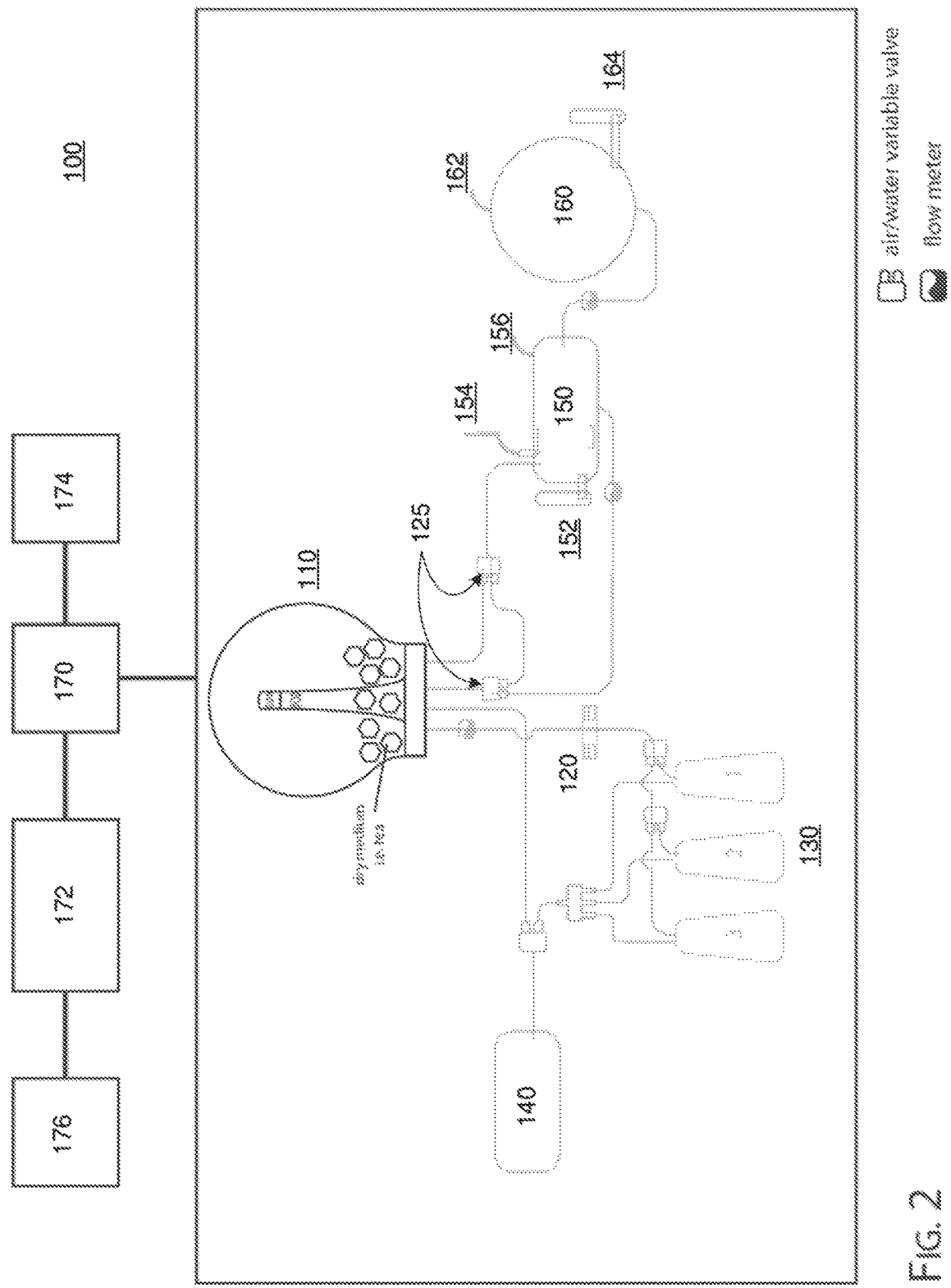
FIG. 2 is a diagram of a stage in the multi-course infusion method for tea brewing using the example apparatus of FIG. 1.

1. Referring to FIG. 2, five grams of tea is loaded into infusion chamber 110 of example apparatus 100.

1-a. For the multi-course infusion process of the present disclosure, only 5 grams of tea is necessary as compared to 10 grams used in conventional single-course infusion methods.

1-b. The actual amount of tea used will depend on the type of tea and desired result of the tea beverage. However, in a study conducted by the inventor of the present disclosure, between the multi-course infusion and conventional single-course infusion methods, the multi-course infusion process typically uses 25~50% less dry tea leaves to produce the same amount of tea beverage volume and is comparable or better in aroma and taste.

Figure 3:
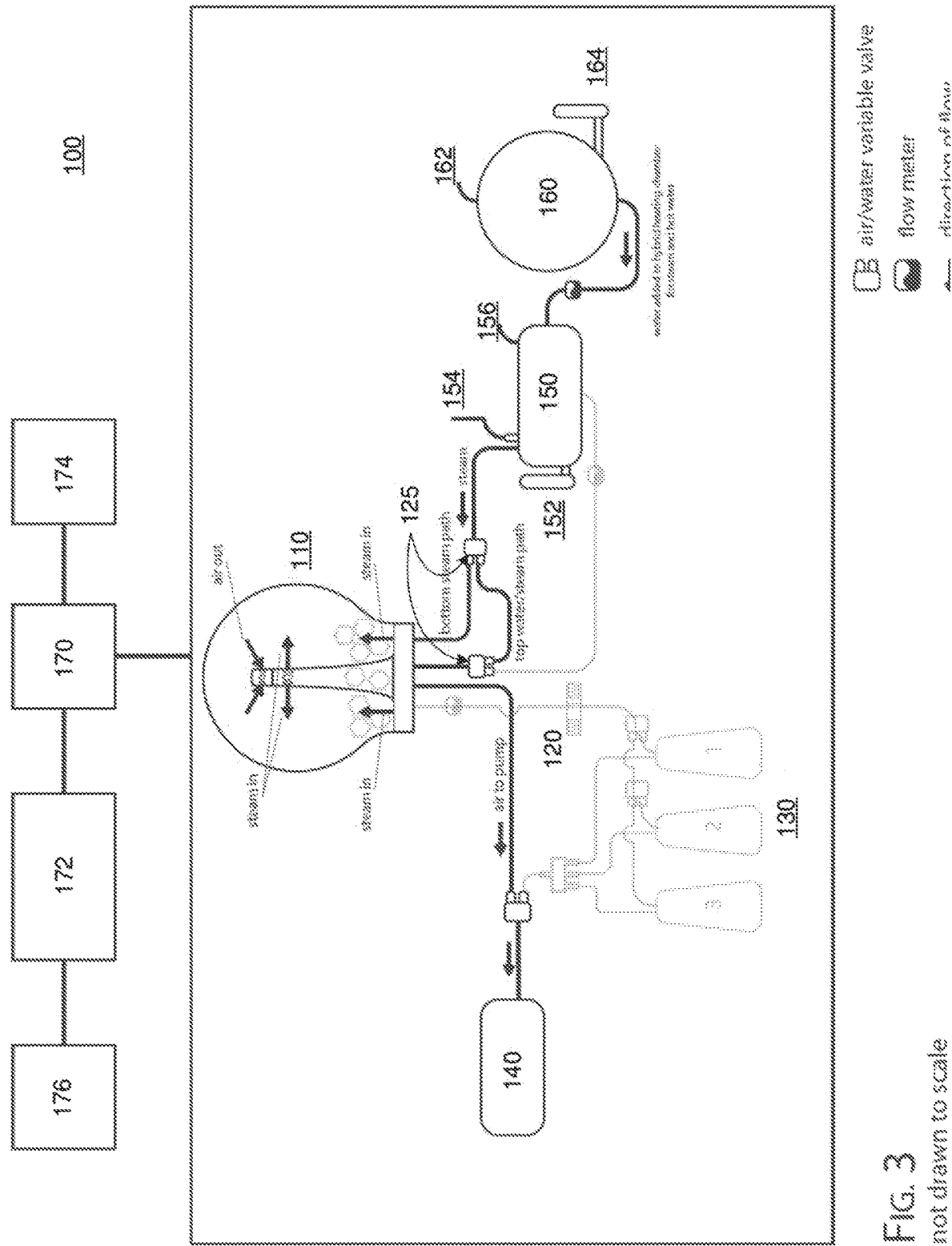
FIG. 3 is a diagram of a stage in the multi-course infusion method for tea brewing using the example apparatus of FIG. 1.

2. Referring to FIG. 3, steam is drawn into the infusion chamber 110 of example apparatus 100 from air orifices at the bottom (bottom steam path) and the orifices on the central shaft (top water/steam path) for 15 seconds to pre-condition the dry tea leaves.

2-a. The range of time for the steam may vary from 1 second to 60 seconds, with the ideal timing dependent on the type of tea.

2-b. The amount of steam entering into infusion chamber 110 via the two paths is variably controlled via one or more of the air/water variable valves 125. The range of amount of steam entering from the top and bottom may range from 100% top and 0% bottom to 0% top and 100% bottom.

2-c. The steam relaxes and dampens the surface of the dry tea leaves to make the tea leaves more water absorbent. If the tea leaves are too dry, e.g., having moisture content of less than 5% therein, the surface of the tea leaves tends to have a negative, detrimental hydrophobic behavior, which prohibits proper compound extraction.

Figure 4:
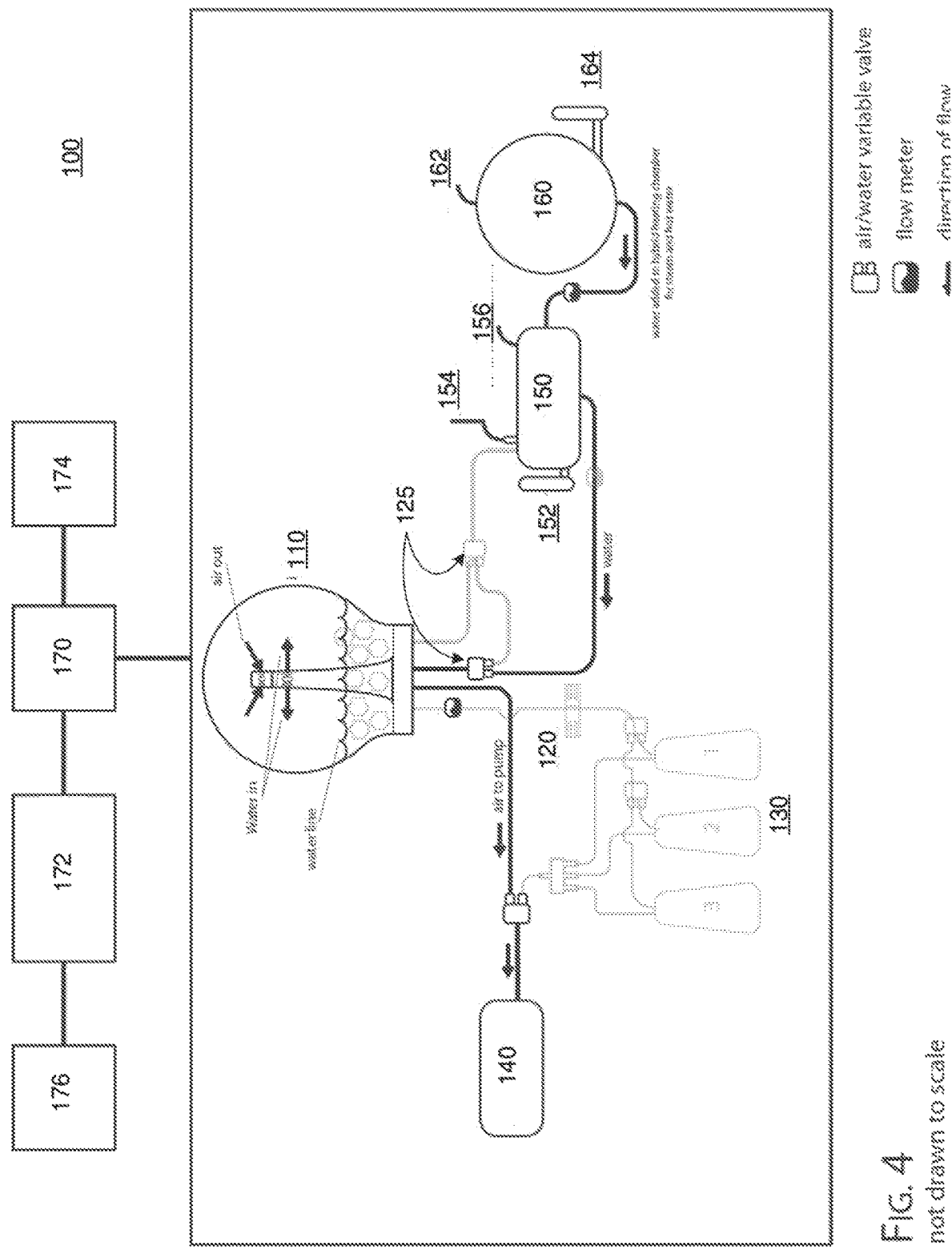
FIG. 4 is a diagram of a stage in the multi-course infusion method for tea brewing using the example apparatus of FIG. 1.

3. To start the first course of infusion, hot water is released into the infusion chamber 110 from the orifices on the upper portion of the central shaft, and is showered down onto the tea leaves. This is illustrated in FIG. 4.

3-a. The top dispersion, or "shower down", approach insures the water evenly soaks the tea leaves. Typically, conventional tea brewing machines either release water into the respective infusion chamber from the bottom or haphazardly pour water onto the leaves. Doing so negatively causes some tea leaves to float instead of being soaked in the water. The water dispersion method according to the present disclosure insures that all the tea leaves are properly hydrated.

3-b. In the first infusion, 80 ml of water at 80° C. is used for an infusion time of 45 seconds. The infusion time may vary from 1 second to 5 minutes, depending on the tea or beverage medium in use. It is noteworthy that the amount and temperature of the water as well as the infusion time for every course are fully adjustable by the user.

Figure 5:
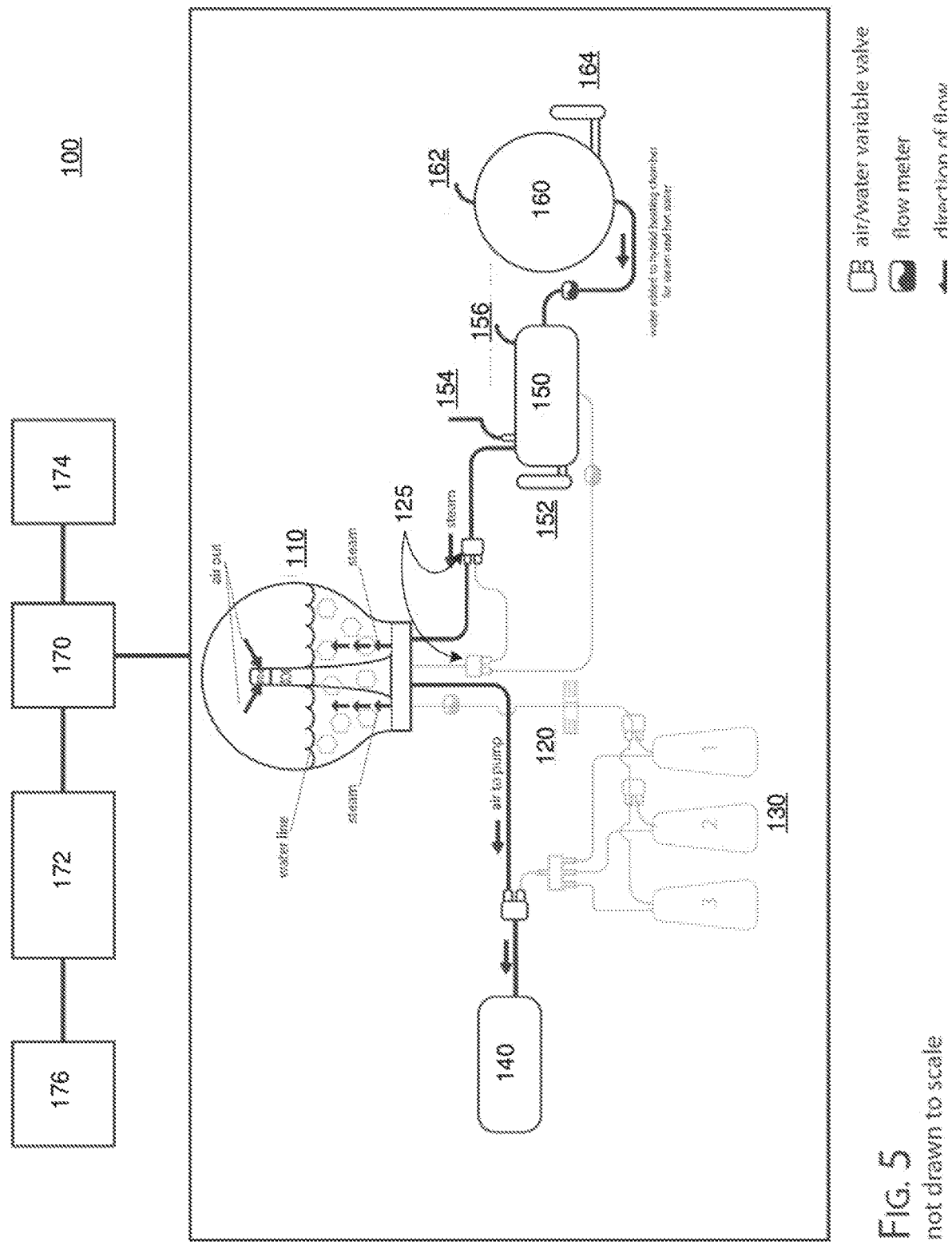
FIG. 5 is a diagram of a stage in the multi-course infusion method for tea brewing using the example apparatus of FIG. 1.

3-c. Referring to FIG. 5, steam is drawn into the infusion chamber 110 via the orifices at the bottom of the infusion chamber 110 for three main purposes: (i) to help control the temperature of the water in the infusion chamber 110, and temperature may be held at a constant or dynamically lowered or raised; (ii) to help circulate the tea and water in the infusion chamber 110 to promote even release of tea compounds, where the design of the infusion chamber 110 and central shaft in the middle promotes even circulation of tea and water in a visually pleasing fashion; and (iii) the steam helps accelerate the release of the properties of tea leaves into the water. The amount of steam drawn into the infusion chamber 110 may be dynamically controllable via one or more of the following: (a) the position of air/water variable valves 125, or combination of air/water variable valves 125 between air pump/vacuum 140 and WSHHC 150; (b) the duration of the draw; and (c) the amount of pressure created by the pressure pump.

3-d. Infusion times for typical teas range from of 30 seconds to 2 minutes for the first infusion course.

3-e. The aromatics of the tea are typically released during the early part of infusion process at a temperature of approximately 70~85° C. Typically, the complex flavors of teas, such as Oolong, are best extracted from the leaves at 85~97° C. after soaking for 45 to 90 seconds.

3-f. The infusion chamber 110 may hold as little as 50 ml to as much as 200 ml of water per infusion. The capacity may be changed to be less than 50 ml or greater than 200 ml by using other infusion chamber and shaft combinations. The size of the chamber does not affect the process.

Figure 6:
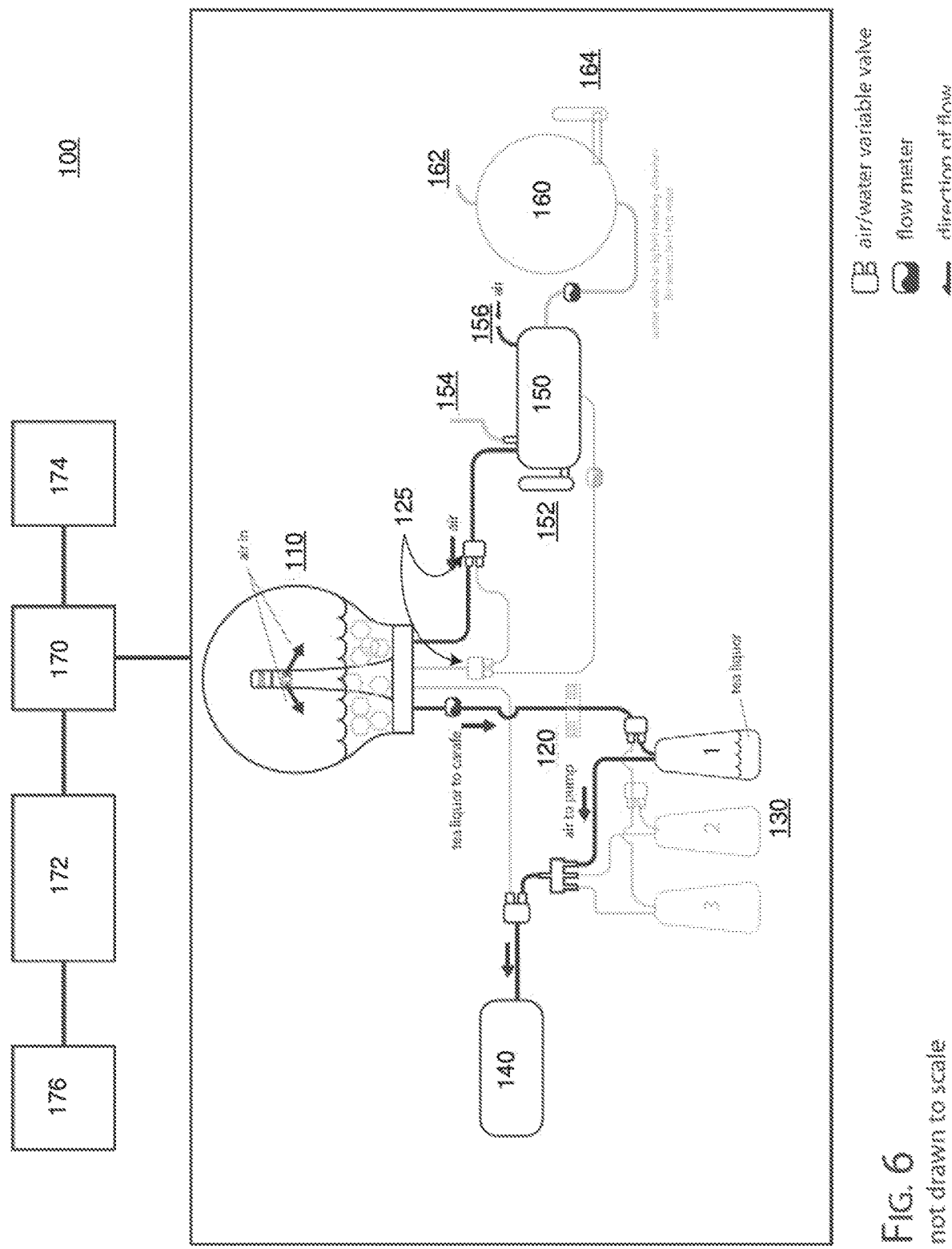
FIG. 6 is a diagram of a stage in the multi-course infusion method for tea brewing using the example apparatus of FIG. 1.

4. Once a period of time of 45 seconds has elapsed, a valve at the bottom of the infusion chamber 110 opens and the beverage is drawn out into the serving carafe, e.g., carafe 1, as shown in FIG. 6.

4-a. There is an adjustable aerator 120 between the infusion chamber 110 and the carafe. The aerator mixes air into the beverage as the beverage passes through the aerator.

4-b. The purpose of the aerator is three-fold, including the following: (a) mixing ambient air into the beverage, lowers its temperature from 65~95° C. to a storage and/or drinking temperature of 45~65° C.; (b) air mixed with the tea beverage releases more aromatics; and (c) mixing air into the beverage enhances the detection of subtle flavor characteristics on the consumer's palate.

Figure 7:
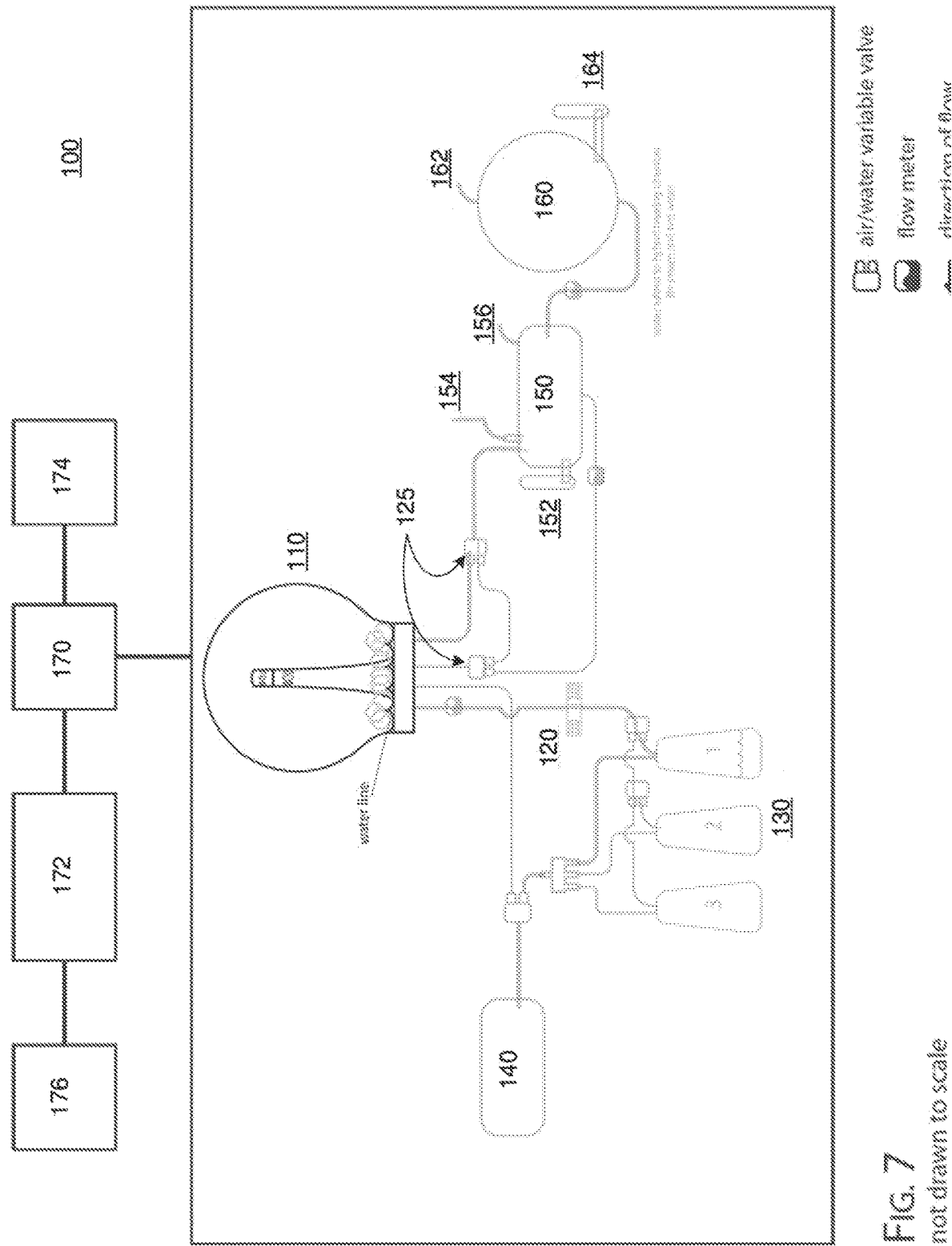
FIG. 7 is a diagram of a stage in the multi-course infusion method for tea brewing using the example apparatus of FIG. 1.

5. At this point, the recipe has the option to "rest the tea" once the tea beverage has been drawn out. "Resting the tea" refers to not having tea leaves sitting in any liquid other than what small amount (>10 ml) that could not be drawn out by the process. By resting the tea, the release of heavier and larger chemical compounds from the tea leaves may be better controlled. This is illustrated in FIG. 7.

5-a. Infusion in its simplest form is an osmosis process. That process continues as long as the tea is submerged in liquid. In this case, chemicals continue to travel through the leaves from the deepest part to just below the surface before the chemicals are released into the liquid. Heavier and larger chemical compounds such as tannins (which can cause bitterness and pucker in a user's palate) take more time to be released. Osmosis may stop when equilibrium is reached between the interior of the leaves and the surrounding liquid. When tea leaves are continuously submerged, as in the case of conventional single-course infusion, heavier chemical compounds have a higher degree of probability to be released. The osmosis process is dynamic. It is faster when imbalance between inside of the tea leaves and liquid is greater, and slower when the imbalance is smaller. The resting process removes excessive water from the vessel so the imbalance would decrease faster between inside of the tea leaves with the smaller amount of remaining water around tea leaves; thus slowing down the osmosis process.

5-b. The resting process between infusions in a series may be varied from 1 second to 1 minute depending on the type of tea and targeted result for the beverage. For Oolong, the resting time may be approximately 5 seconds.

Figure 8:
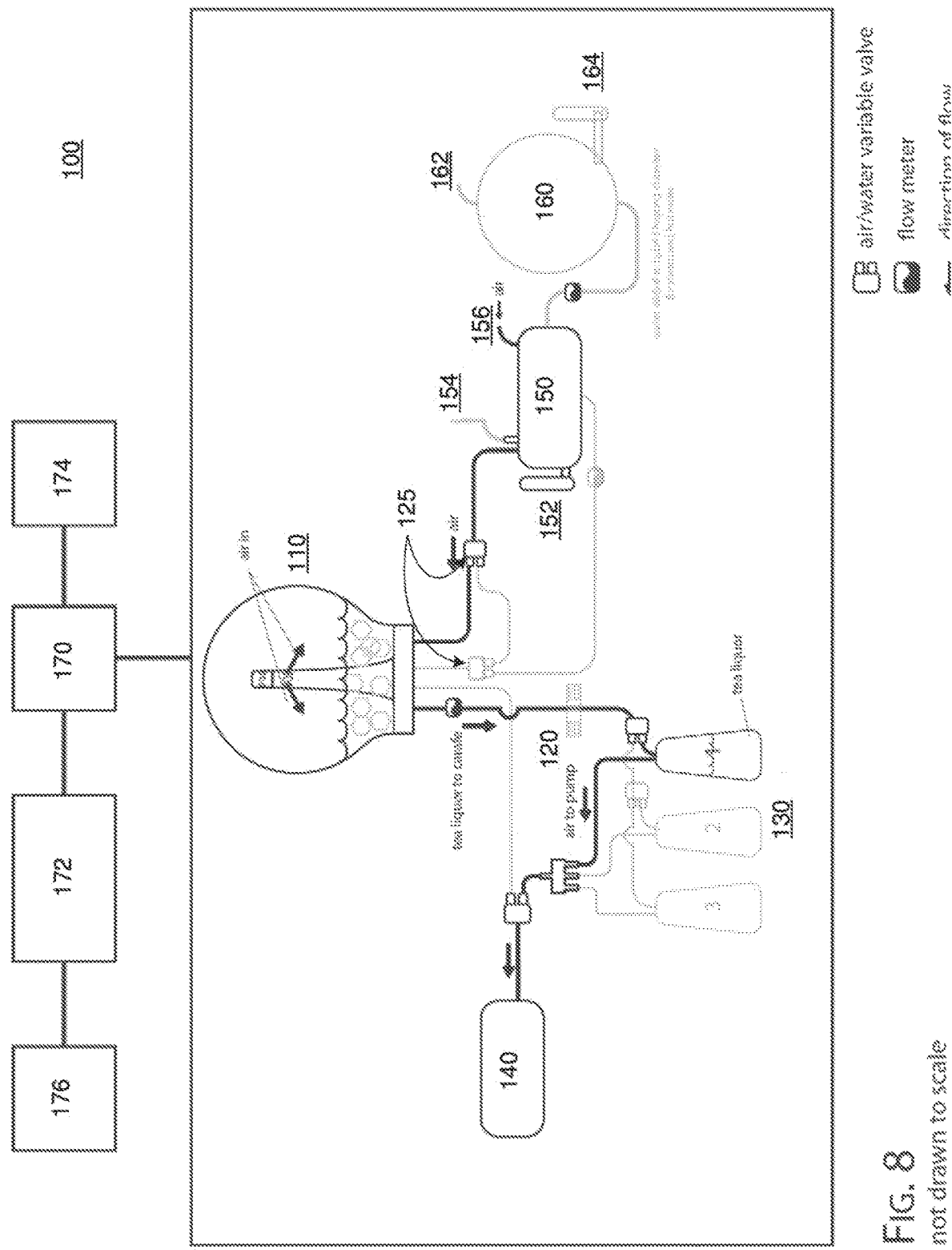
FIG. 8 is a diagram of a stage in the multi-course infusion method for tea brewing using the example apparatus of FIG. 1.

6. After resting the tea, 90 ml of water at 90° C. is again drawn into the infusion chamber 110 via the "shower down" method. Based on testing conducted by the inventor, this infusion course may be a longer (e.g., 1 minute). Steam is also again drawn into the infusion chamber 110. After 1 minute, the resulting beverage is drawn out of the infusion chamber 110 through the aerator, and into the carafe that already contains 80 ml from the previous infusion. This results in an amount of 170 ml of beverage in the serving carafe. This is illustrated in FIG. 8.

6-a. Note that the temperature and the time of each course are dependent on the tea using and the desired result, e.g., a stronger flavored tea or a lighter flavored tea. These are parameters that are adjustable.

7. For the third infusion, the process does not rest the tea. Rather, an amount of 65 ml of water at 85° C. is immediately drawn into the infusion chamber 110 via the "shower down" method. This course lasts approximately 50 seconds. Steaming is the same process, but the rate is increased by 30%.

7-a. By now, the tea leaves have increased substantially in size from their original dried state. Additionally, additional steam is provided for the desired circulation.

Figure 9:
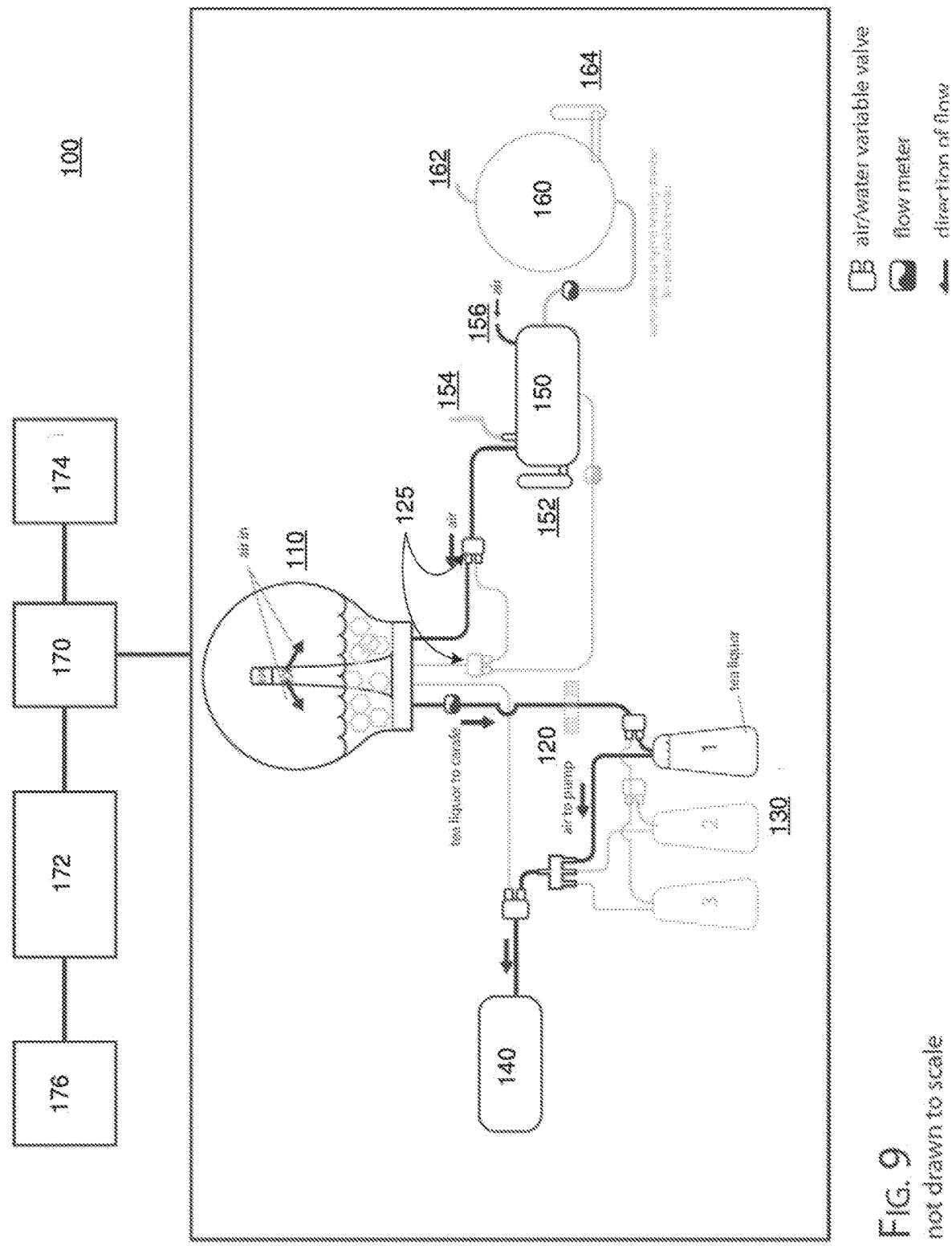
FIG. 9 is a diagram of a stage in the multi-course infusion method for tea brewing using the example apparatus of FIG. 1.

8. After 50 seconds, the valve opens and liquid is drawn through the aerator 120, then into one or more of the carafes 130 in which the beverage from previous infusion courses is stored at a serving temperature. This is illustrated in FIG. 9.

Of course, the time of each steam/infuse/rest cycle is adjustable according to the type of tea, or beverage medium, and personal preferences. Likewise, the water temperature, steam amount, and courses of infusion cycles are all variables that may be adjusted and fine-tuned according to user preferences.

The combination of time, temperature and other factors in the multi-course infusion process is referred to as a recipe. In some embodiments, to complement the brewing process, an online forum is provided for users, including consumers, tea providers and the like, to exchange and share recipes. In some embodiments, apparatus 100 of the present disclosure is configured with capability to connect to one or more wireless and/or wired networks such as local area network (LAN), metropolitan area network (MAN), wide area network (WAN) and/or the Internet, recipes for one or more types of tea and/or other beverage mediums may easily be downloaded to a use of apparatus 100 of the present disclosure.

Figure 10:
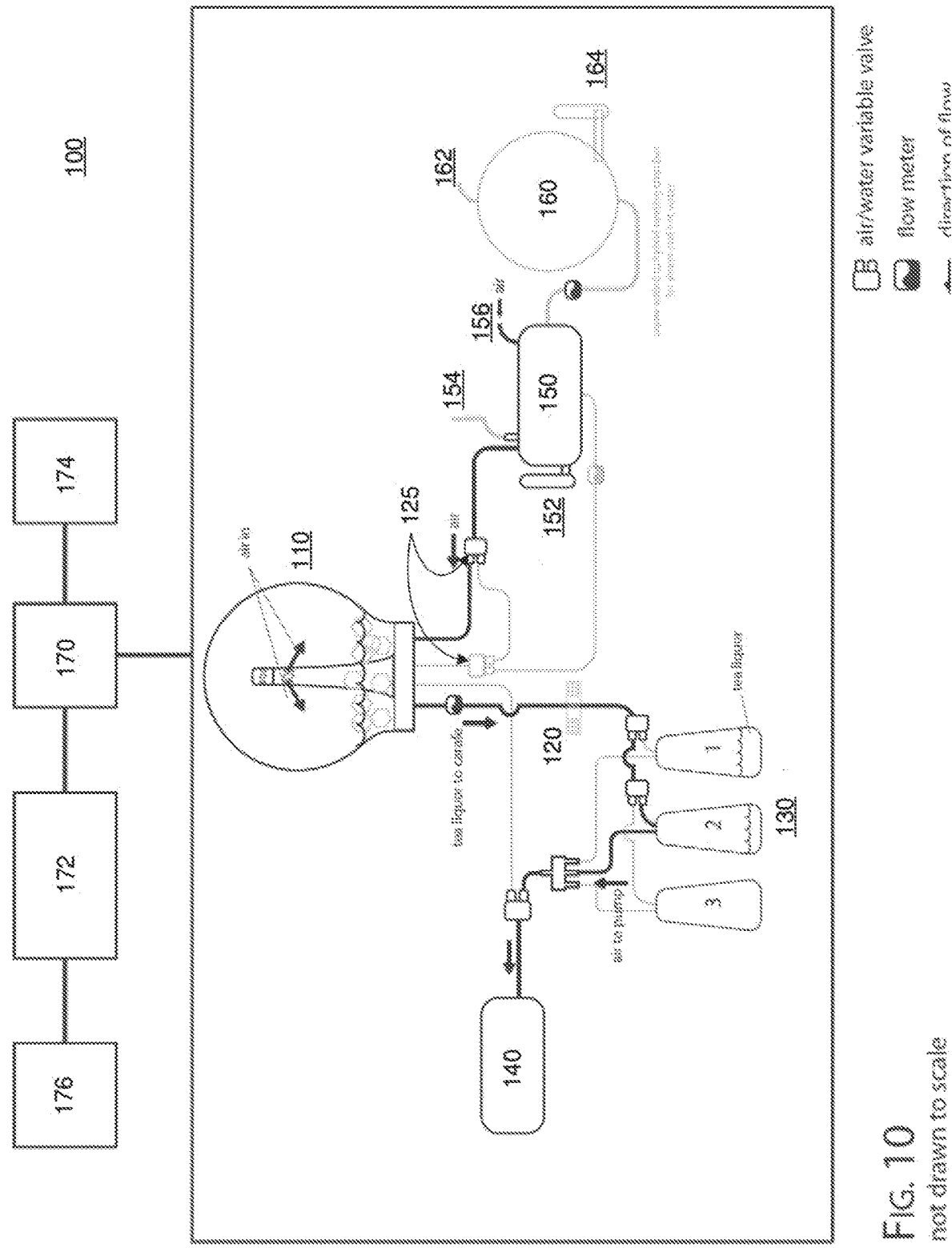
FIG. 10 is a diagram of a stage in the multi-course infusion method for tea brewing using the example apparatus of FIG. 1.
Figure 11:
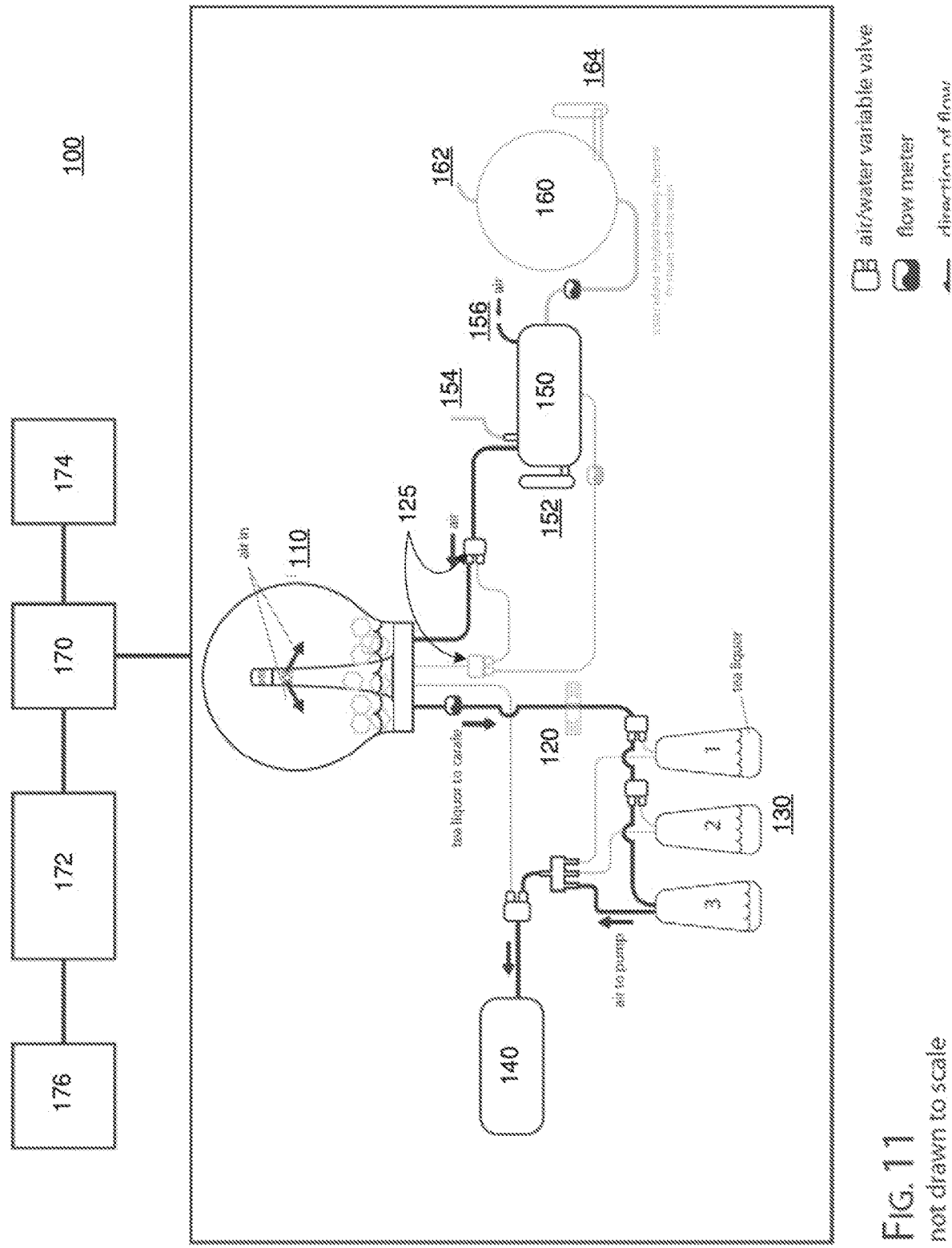
FIG. 11 is a diagram of a stage in the multi-course infusion method for tea brewing using the example apparatus of FIG. 1.

In some embodiments, example apparatus 100 may also vary the distribution of resulting beverage from a single course of infusion to multiple carafes, e.g., carafes 130. This is useful to equally distribute beverage to multiple carafes thus the quality of beverage in the multiple carafes will be consistent from carafe to carafe when larger quantity of beverage is infused. This process is illustrated in FIG. 10 and FIG. 11. Although three carafes 130 are depicted, this process is not limited to three carafes, and the number of carafes may be scaled down to just two carafes or up to hundreds of carafes. In some embodiments, example apparatus 100 may have two to five carafes. The amount of beverage distributed to each carafe is measured by the flow meter and controlled by air/water variable valves 120. For this example the beverage from one course of infusion is equally distributed into three carafes 130. Of course, the distribution may be varied from 0% to 100% from carafe to carafe.

Figure 12:
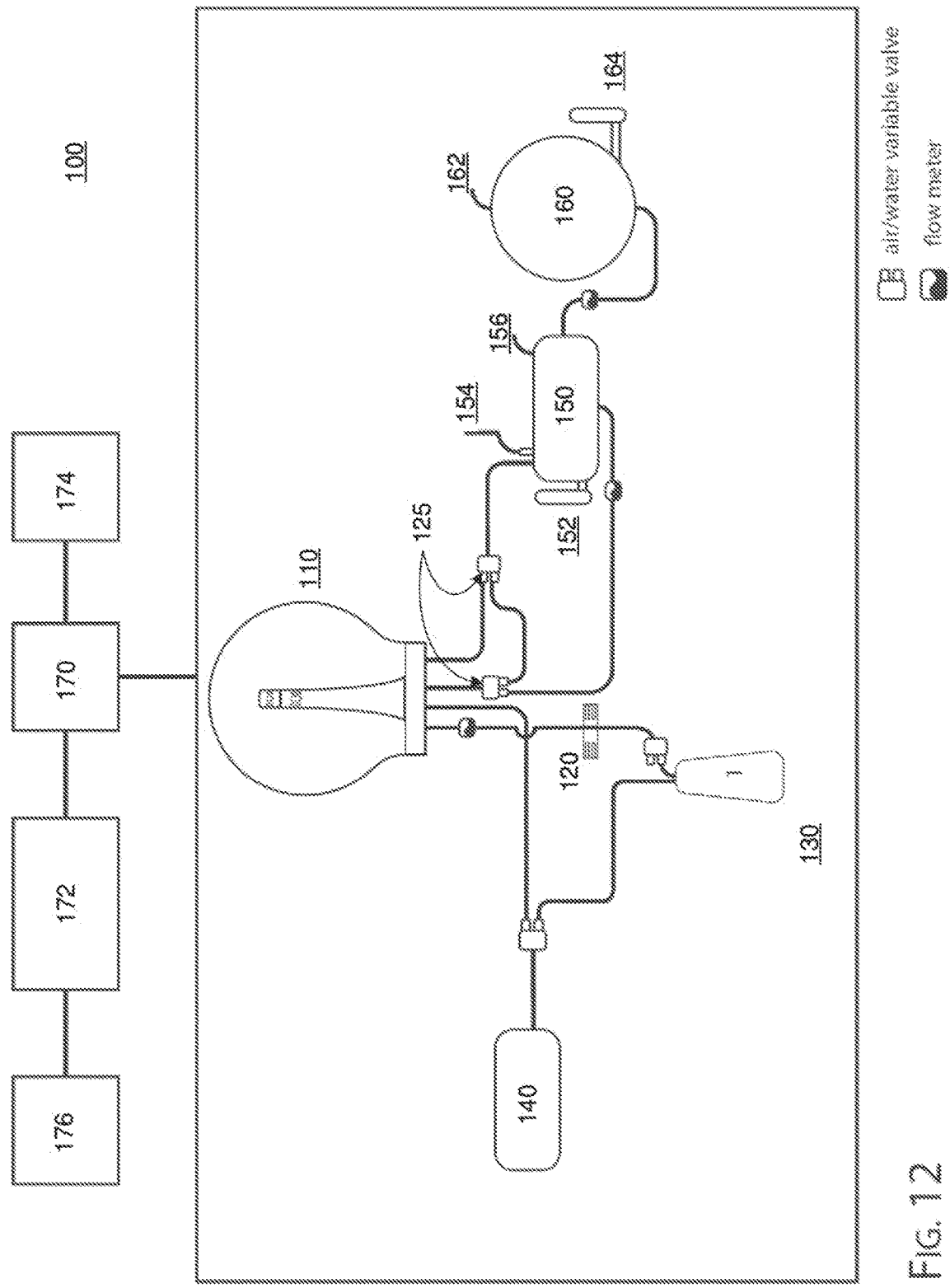
FIG. 12 is a diagram of a stage in the multi-course infusion method for tea brewing using the example apparatus of FIG. 1.

At the same time the multi-course infusion process may also be implemented in a single carafe machine, as illustrated in FIG. 12. In this scenario, every course of infusion is placed in the carafe, thus creating composition beverage with mixture of one, two, three, four, five, six courses of infusion. In some embodiments, the ideal composite may be from two or three courses.

Figure 13A:
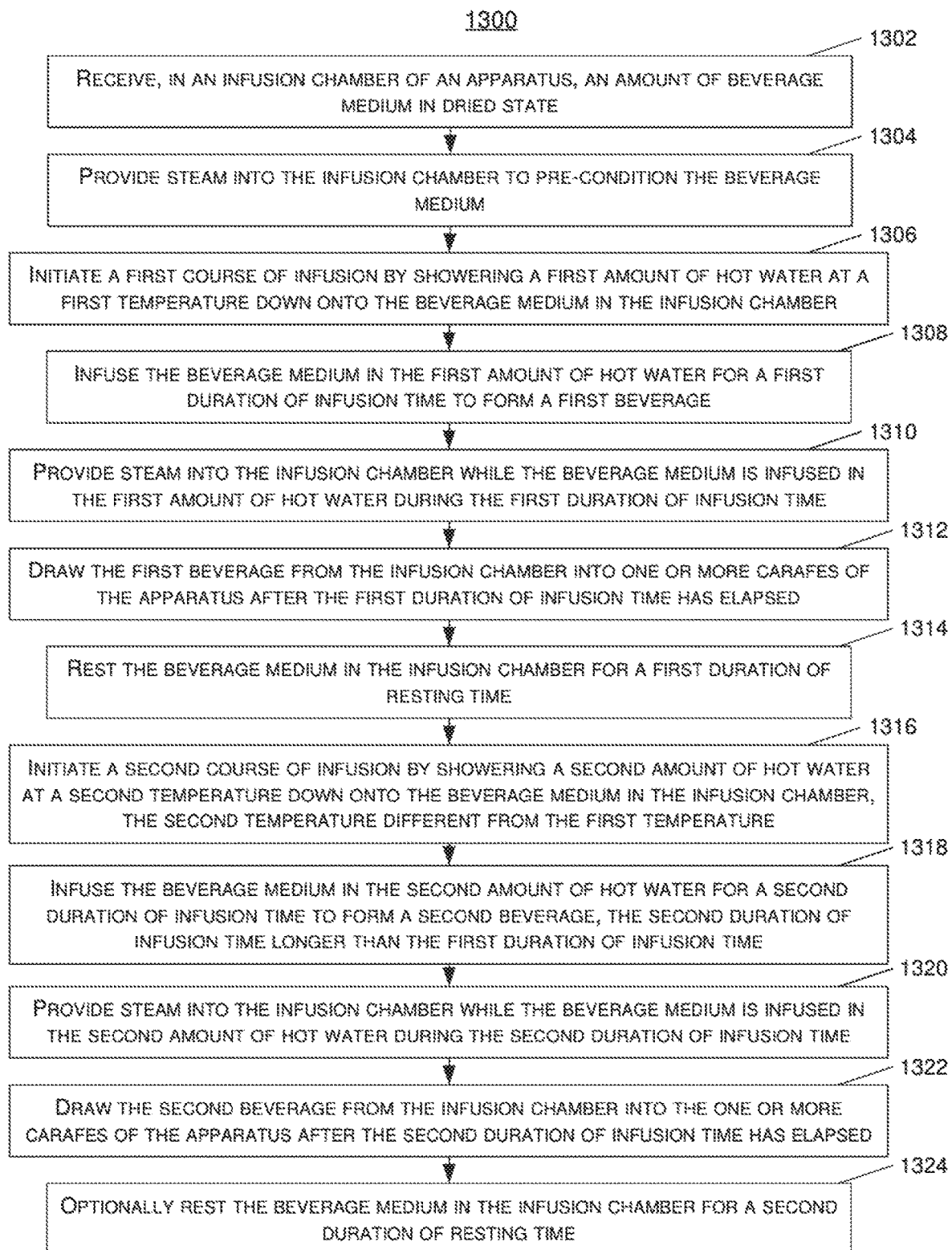
FIG. 13A is a flowchart of a multi-course infusion method for tea brewing in accordance with an embodiment of the present disclosure.

FIG. 13A is a flowchart of a multi-course infusion processing flow 1300 for tea brewing, arranged in accordance with at least some embodiments described herein. Processing flow 1300 may be implemented by example apparatus 100. Further, processing flow 1300 may include one or more operations, actions, or functions depicted by one or more blocks 1302-1324. Although illustrated as discrete blocks, various blocks may be divided into additional blocks, combined into fewer blocks, or eliminated, depending on the desired implementation. For illustrative purpose, processing flow 1300 is described in the context of example apparatus 100. Processing flow 1300 may begin at block 1302.

At 1302, an amount of beverage medium in dried state is received in an infusion chamber of example apparatus 100.

At 1304, steam is provided into the infusion chamber 110 to pre-condition the beverage medium.

At 1306, a first course of infusion is initiated by showering a first amount of hot water at a first temperature down onto the beverage medium in the infusion chamber 110.

At 1308, the beverage medium is infused in the first amount of hot water for a first duration of infusion time to form a first beverage.

At 1310, steam is provided into the infusion chamber 110 while the beverage medium is infused in the first amount of hot water during the first duration of infusion time.

At 1312, the first beverage is drawn from the infusion chamber 110 into one or more carafes 130 of example apparatus 100 after the first duration of infusion time has elapsed.

At 1314, the beverage medium is rested in the infusion chamber 110 for a first duration of resting time.

At 1316, a second course of infusion is initiated by showering a second amount of hot water at a second temperature down onto the beverage medium in the infusion chamber 110, with the second temperature different from the first temperature.

At 1318, the beverage medium is infused in the second amount of hot water for a second duration of infusion time to form a second beverage, with the second duration of infusion time longer than the first duration of infusion time.

At 1320, steam is provided into the infusion chamber 110 while the beverage medium is infused in the second amount of hot water during the second duration of infusion time.

At 1322, the second beverage is drawn from the infusion chamber 110 into the one or more carafes 130 of example apparatus 100 after the second duration of infusion time has elapsed.

At 1324, optionally, the beverage medium is rested in the infusion chamber 110 for a second duration of resting time.

In some embodiments, the beverage medium may include 5 grams of tea leaves of Oolong tea.

In some embodiments, providing steam into the infusion chamber to pre-condition the beverage medium may include providing the steam into the infusion chamber for to pre-condition the tea leaves for an amount of time ranging from 1 second to 60 seconds.

In some embodiments, initiating the first course of infusion by showering the first amount of hot water at the first temperature down onto the beverage medium in the infusion chamber may include initiating the first course of infusion by showering 80 milliliters of hot water at 80° C. down onto the beverage medium in the infusion chamber.

In some embodiments, the first duration of infusion time may be in a range of 30 seconds to 2 minutes.

In some embodiments, the first duration of resting time may be 5 seconds.

In some embodiments, initiating the second course of infusion by showering the second amount of hot water at the second temperature down onto the beverage medium in the infusion chamber may include initiating the second course of infusion by showering 90 milliliters of hot water at 90° C. down onto the beverage medium in the infusion chamber.

In some embodiments, the first duration of infusion time may be 45 seconds and the second duration of infusion time may be 1 minute.

In some embodiments, processing flow 1300 may further include the following operations: initiating a third course of infusion by showering a third amount of hot water at a third temperature down onto the beverage medium in the infusion chamber, with the third temperature between the first temperature and the second temperature; infusing the beverage medium in the third amount of hot water for a third duration of infusion time to form a third beverage, with the third duration of infusion time shorter than the second duration of infusion time; providing steam into the infusion chamber while the beverage medium is infused in the third amount of hot water during the third duration of infusion time; and drawing the third beverage from the infusion chamber into the one or more carafes of the apparatus after the third duration of infusion time has elapsed.

In some embodiments, initiating the third course of infusion by showering the third amount of hot water at the third temperature down onto the beverage medium in the infusion chamber may include initiating the third course of infusion by showering 65 milliliters of hot water at 85° C. down onto the beverage medium in the infusion chamber.

In some embodiments, the third duration of infusion time may be 50 seconds.

Figure 13B:
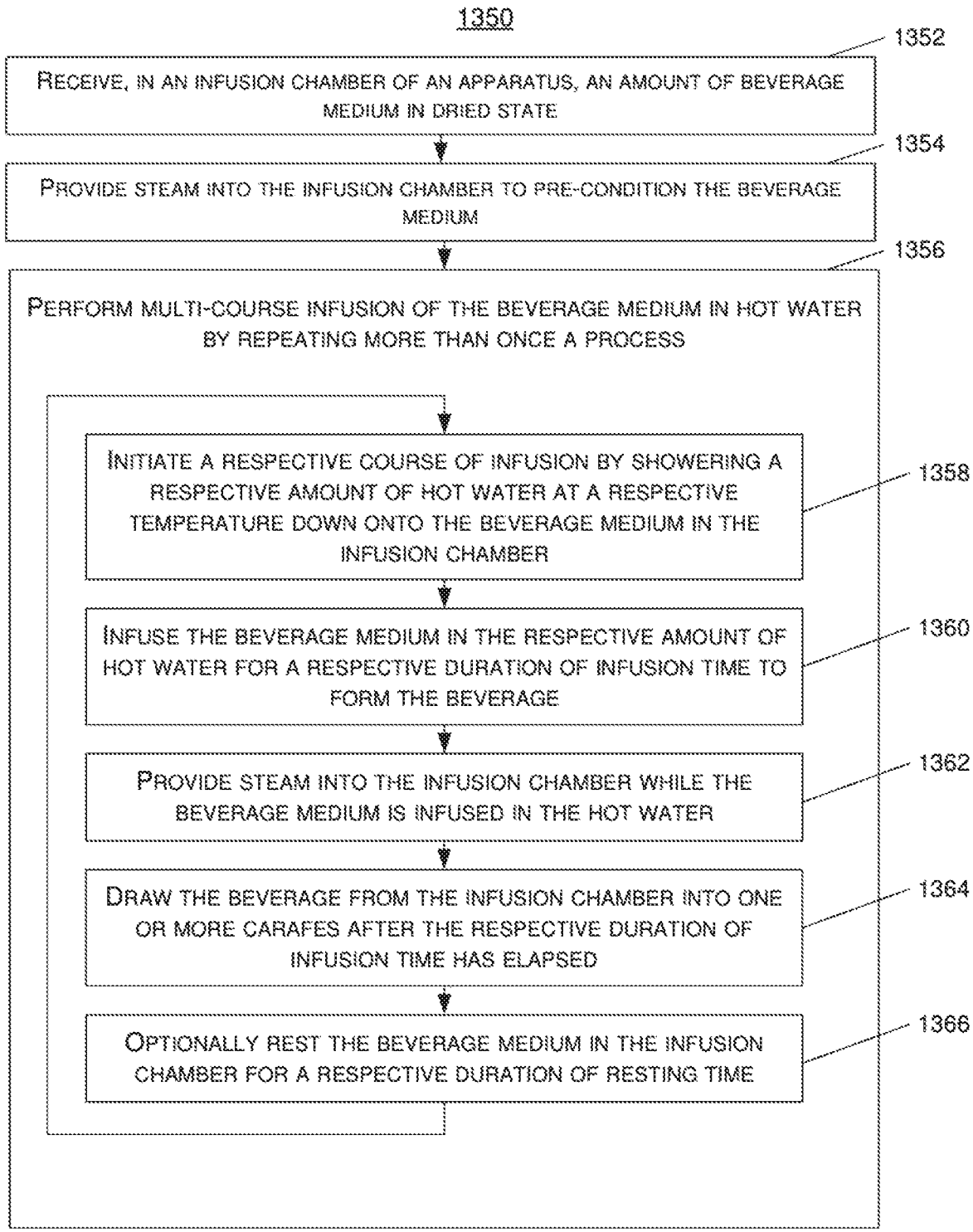
FIG. 13B is a flowchart of a multi-course infusion method for tea brewing in accordance with another embodiment of the present disclosure.

FIG. 13B is a flowchart of a multi-course infusion processing flow 1350 for tea brewing, arranged in accordance with at least some embodiments described herein. Processing flow 1350 may be implemented by example apparatus 100. Further, processing flow 1350 may include one or more operations, actions, or functions depicted by one or more blocks 1352-1366. Although illustrated as discrete blocks, various blocks may be divided into additional blocks, combined into fewer blocks, or eliminated, depending on the desired implementation. For illustrative purpose, processing flow 1350 is described in the context of example apparatus 100. Processing flow 1350 may begin at block 1352.

At 1352, an amount of beverage medium in dried state is received in infusion chamber 110 of example apparatus 100.

At 1354, steam is provided into the infusion chamber 110 to pre-condition the beverage medium.

At 1356, multi-course infusion of the beverage medium in hot water is performed by repeating more than once a process.

At 1358, the process initiates a respective course of infusion by showering a respective amount of hot water at a respective temperature down onto the beverage medium in the infusion chamber 110.

At 1360, the process infuses the beverage medium in the respective amount of hot water for a respective duration of infusion time to form the beverage.

At 1362, the process provides steam into the infusion chamber 110 while the beverage medium is infused in the hot water.

At 1364, the process draws the beverage from the infusion chamber 110 into one or more carafes 130 after the respective duration of infusion time has elapsed.

At 1366, the process optionally rests the beverage medium in the infusion chamber 110 for a respective duration of resting time.

In some embodiments, providing steam into the infusion chamber to pre-condition the beverage medium may include providing the steam into the infusion chamber from air orifices at a bottom of the infusion chamber and from orifices on a central shaft of the infusion chamber.

In some embodiments, initiating the first course of infusion by showering the first amount of hot water at the first temperature down onto the beverage medium in the infusion chamber may include showering the first amount of hot water from orifices on an upper portion of a central shaft of the infusion chamber.

In some embodiments, performing multi-course infusion of the beverage medium may include: initiating a first course of infusion by showering a first amount of hot water at a first temperature down onto the beverage medium in the infusion chamber; infusing the beverage medium in the first amount of hot water for a first duration of infusion time to form a first beverage; providing steam into the infusion chamber while the beverage medium is infused in the first amount of hot water during the first duration of infusion time; drawing the first beverage from the infusion chamber into one or more carafes of the apparatus after the first duration of infusion time has elapsed; resting the beverage medium in the infusion chamber for a first duration of resting time; initiating a second course of infusion by showering a second amount of hot water at a second temperature down onto the beverage medium in the infusion chamber, the second temperature different from the first temperature; infusing the beverage medium in the second amount of hot water for a second duration of infusion time to form a second beverage, the second duration of infusion time different from the first duration of infusion time; providing steam into the infusion chamber while the beverage medium is infused in the second amount of hot water during the second duration of infusion time; drawing the second beverage from the infusion chamber into the one or more carafes of the apparatus after the second duration of infusion time has elapsed; and optionally resting the beverage medium in the infusion chamber for a second duration of resting time.

In some embodiments, the method may also include: initiating a third course of infusion by showering a third amount of hot water at a third temperature down onto the beverage medium in the infusion chamber, the third temperature being the same as or different from the first temperature and the second temperature; infusing the beverage medium in the third amount of hot water for a third duration of infusion time to form a third beverage, the third duration of infusion time being the same as or different from the first and second durations of infusion time; providing steam into the infusion chamber while the beverage medium is infused in the third amount of hot water during the third duration of infusion time; and drawing the third beverage from the infusion chamber into the one or more carafes of the apparatus after the third duration of infusion time has elapsed.

In some embodiments, the first, second and third durations of time may be different. The first, second and third temperatures may also be different.

In some embodiments, performing multi-course infusion of the beverage medium may include: providing different amounts of hot water at different temperatures; and infusing the beverage medium in the hot water for different durations of time for different courses of infusion according to one or more recipes.

In some embodiments, the one or more recipes may include a first recipe and a second recipe, where the first recipe may be formed by a user during operation of the apparatus and the second recipe may be downloaded from an external device.

In some embodiments, the method may also include continuously updating at least one of the one or more recipes based on a usage history of a user.

In some embodiments, the usage history may be uploaded (e.g., by example apparatus 100) to a central server that analyzes the usage history to provide a new recipe recommendation to the user.

In some embodiments, the usage history may be uploaded (e.g., by example apparatus 100) to a central server that analyzes the usage history to provide a new tea recommendation to the user.

In some embodiments, performing multi-course infusion of the beverage medium may include: receiving a command from a remote device; and performing the multi-course infusion of the beverage medium in response to receiving the command.

In some embodiments, receiving a command from a remote device may include receiving the command from the remote device via a wireless communication mechanism, a wired communication mechanism, or a combination of wireless and wired communication mechanisms.

Example Carafe

Figure 14:
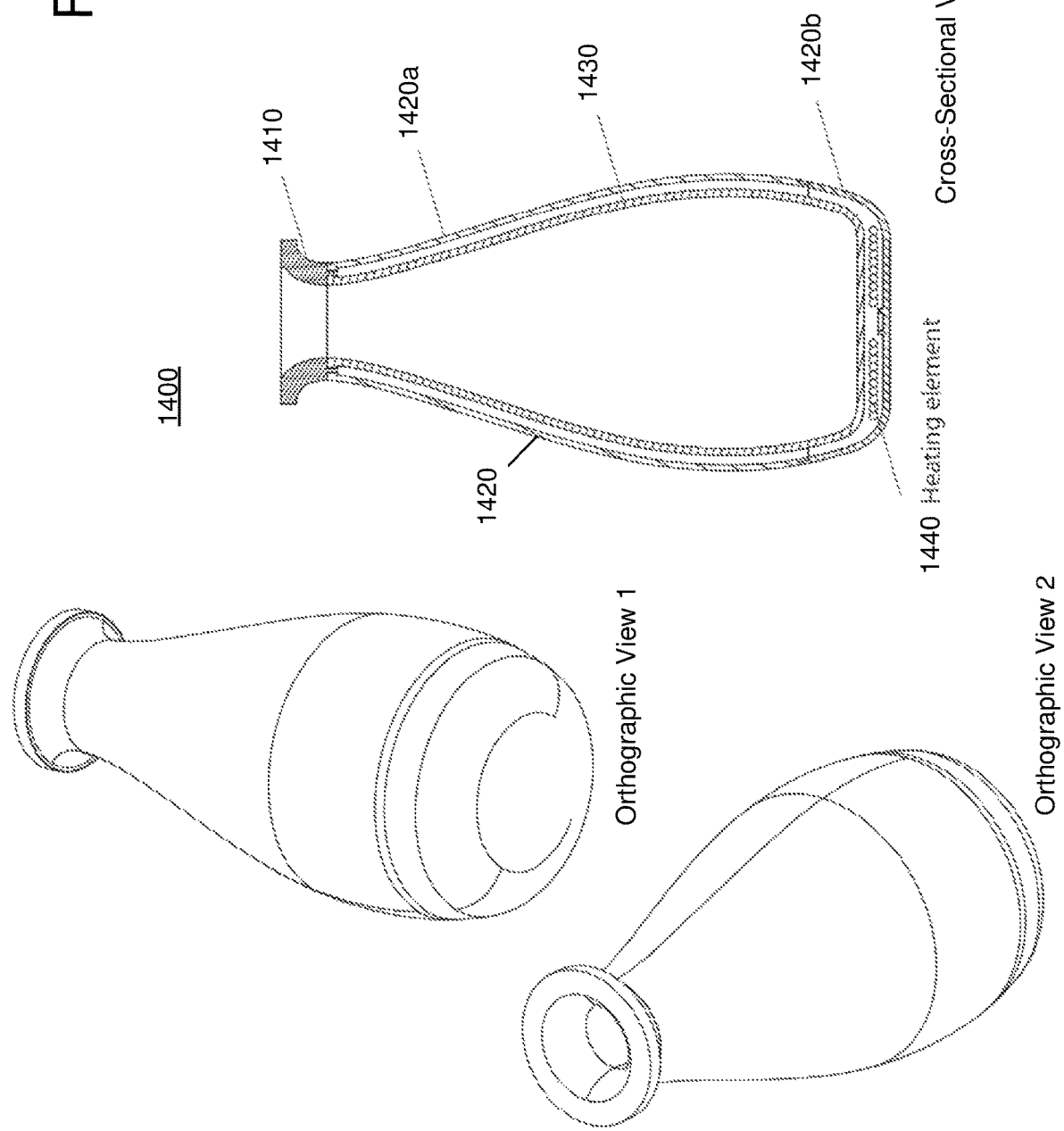
FIG. 14 is a diagram of various views of an example carafe of an apparatus capable of a multi-course infusion method for tea brewing in accordance with an embodiment of the present disclosure.
Figure 16:
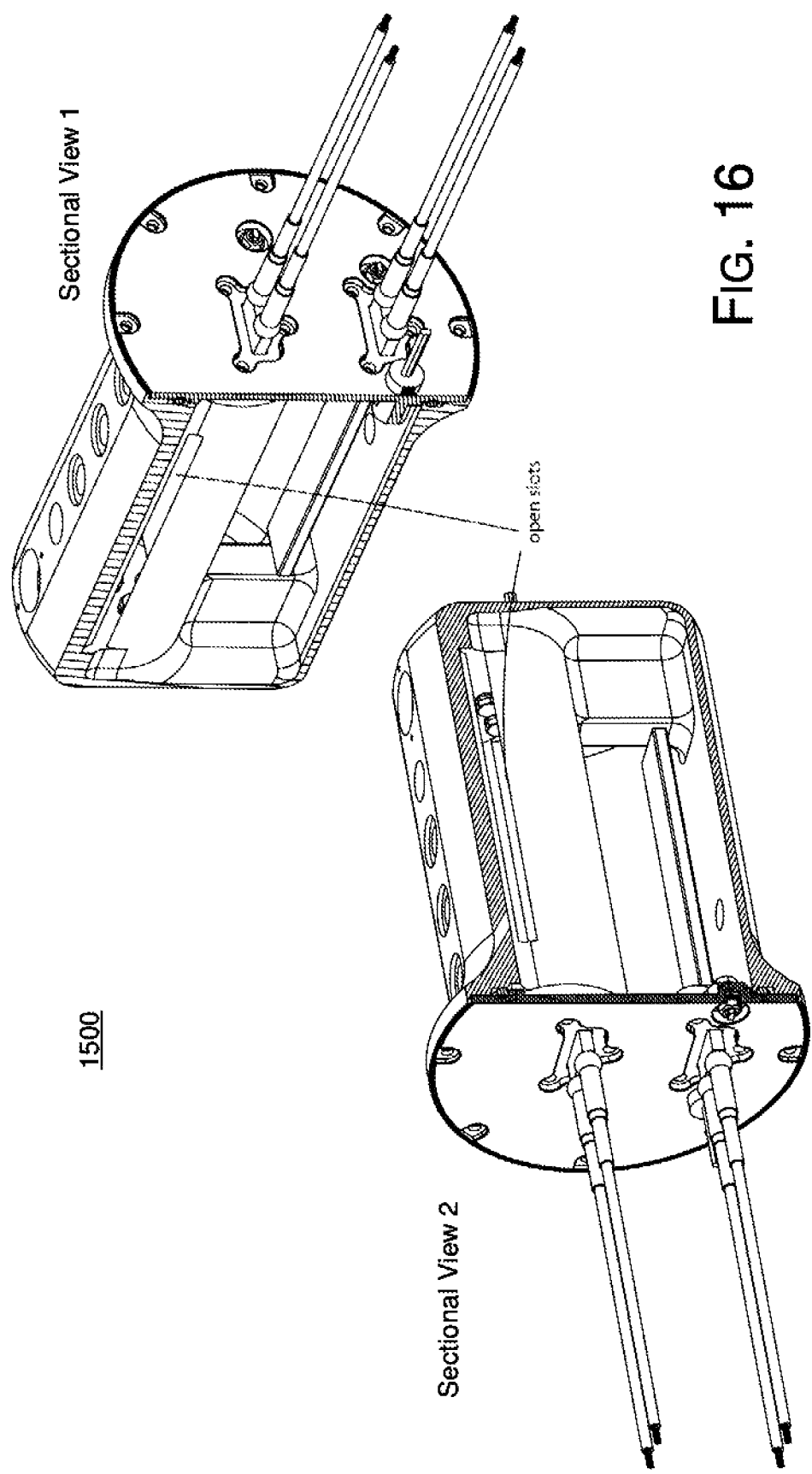
FIG. 16 is a diagram of various views of the example WSHHC of FIG. 15.
Figure 19:
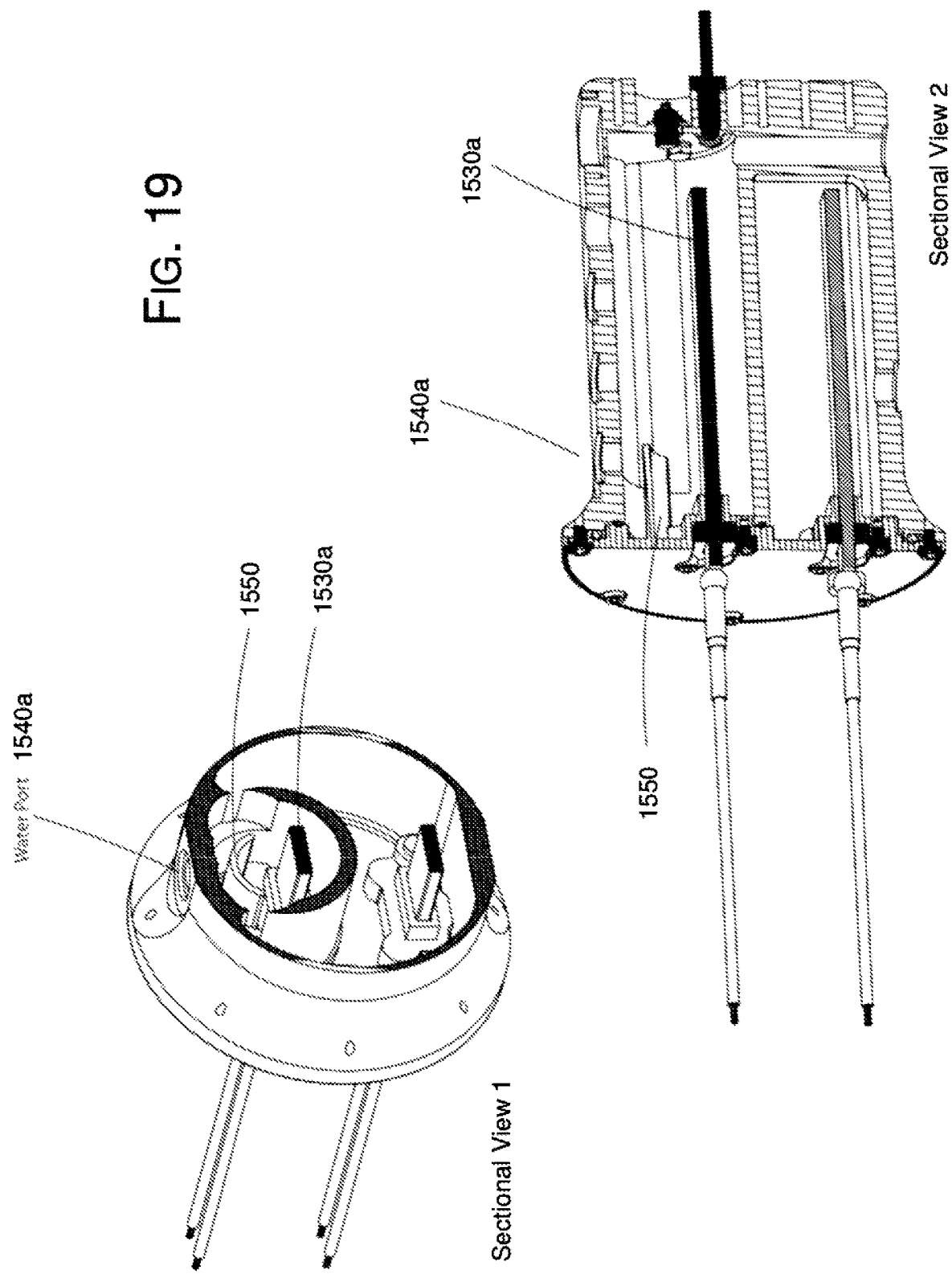
FIG. 19 is a diagram of various views of the example WSHHC of FIG. 15.
Figure 21:
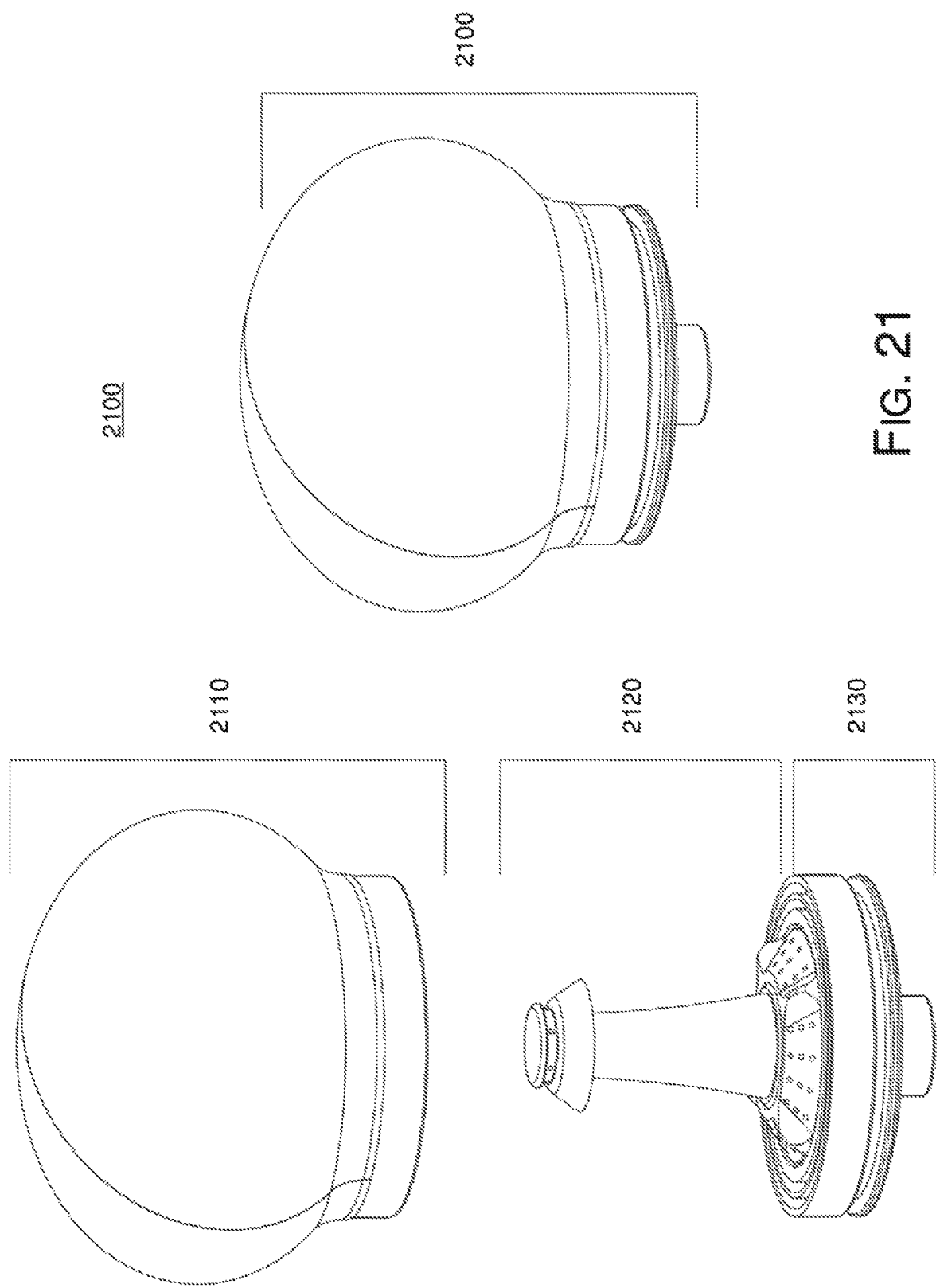
FIG. 21 is a diagram of an assembly of an example infusion chamber of an apparatus capable of a multi-course infusion method for tea brewing in accordance with an embodiment of the present disclosure.
Figure 24:
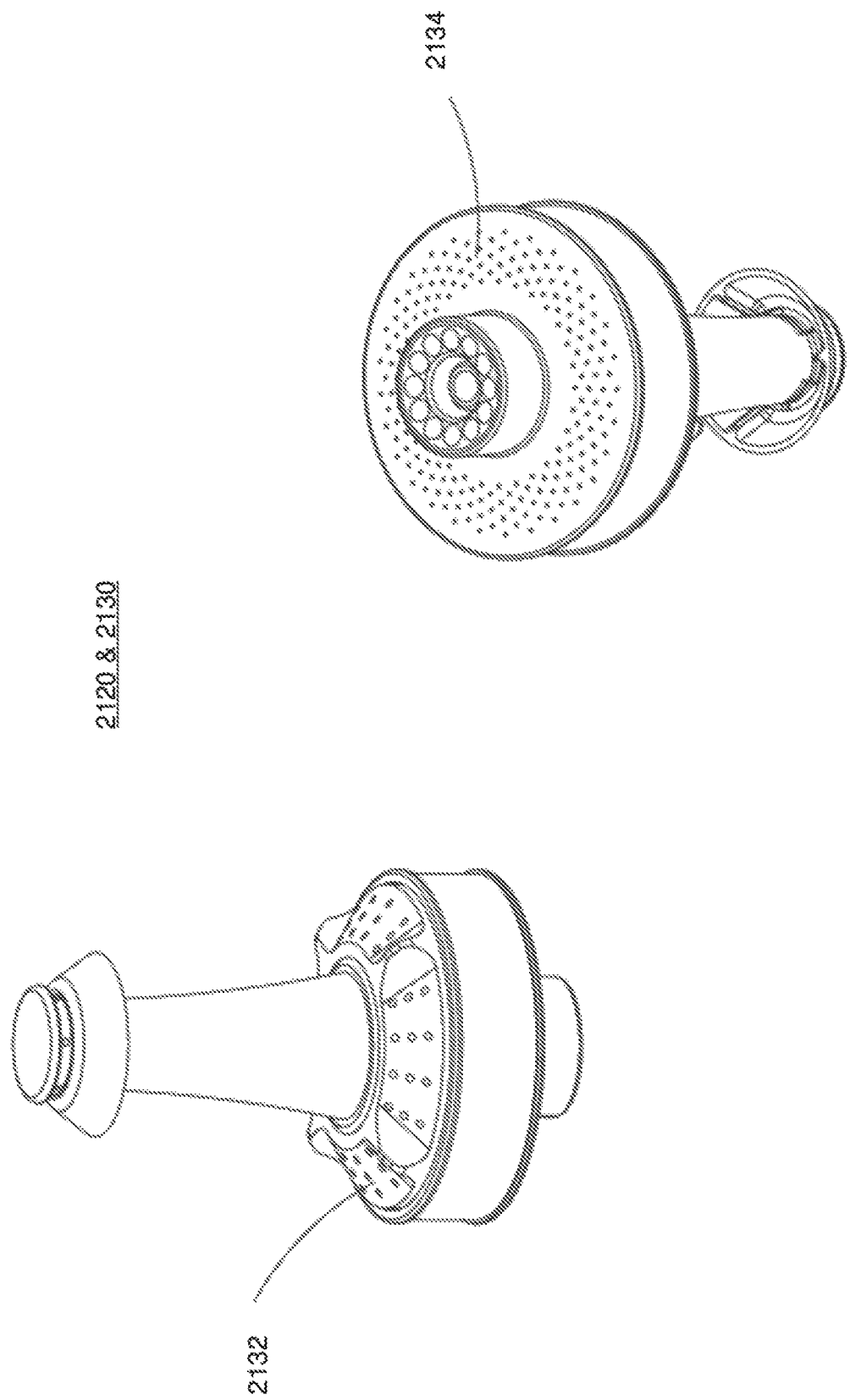
FIG. 24 is a diagram of various views of a component of the example infusion chamber of FIG. 21.

FIG. 14 is a diagram of various views of an example carafe 1400 of an apparatus capable of a multi-course infusion method for tea brewing in accordance with an embodiment of the present disclosure. For example, example carafe 1400 may be one or more of the serving carafes 130 of example apparatus 100 as shown in FIGS. 1-12.

Example carafe 1400 has a collar 1410, an exterior layer 1420 and an interior layer 1430. The exterior layer 1420 has an upper portion 1420*a* and a lower portion 1420*b*. Example carafe 1400 also has a built-in heating element 1440 which may be made of ferrous-magnetic material, for example. The heating element 1440 is sandwiched between the interior layer 1430 and the exterior layer 1420. The ferrous-magnetic material of heating element 1440 may be heated via magnetic resonance heating method. In some embodiments, the heating element 1440 sandwiched in the interior and exterior layers of example carafe 1400 may be a magnetic resonance receiver, thus causing it to heat when power is applied.

In some embodiments, the interior or void of example carafe 1400 (configured to contain the tea beverage therein) may be made of borosilicate glass or a similar material (trade name: Pyrex), which is ideal for holding the tea beverage without imparting any foreign taste or aroma.

In some embodiments, the exterior of example carafe 1400 may be made of an impact-resistant material such as, for example, polycarbonate, polypropylene plastic or the like.

In some embodiments, the space between the interior layer 1430 and the exterior layer 1420 is sealed. That space can be filled with ambient air, inert gas (such as argon), or vacuum to further improve the temperature insulation qualities of example carafe 1400.

In some embodiments, the middle portion of the exterior of example carafe 1400 may include optically clear polycarbonate. This feature allows a user to enjoy the visual aspects of the tea beverage.

In some embodiments, the bottom portion of the exterior layer 1420 may either be optically clear or opaque polycarbonate plastic or low ferrous-magnetic metals.

In some embodiments, the interior layer 1430 and the exterior layer 1420 are joined together at the top by collar 1410. The collar 1410 may be bounded to the two layers via mechanical design and silicon glue.

Example Water Steam Hybrid Heating Chamber (WSHHC)

FIGS. 15-20 show various views of an assembly of an example water steam hybrid heating chamber (WSHHC) 1500 of an apparatus capable of a multi-course infusion method for tea brewing in accordance with an embodiment of the present disclosure. For example, example WSHHC 1500 may the WSHHC 150 of example apparatus 100 as shown in FIGS. 1-12.

Example WSHHC 1500 is of a compact, dual chamber design that can generate steam and hot water simultaneously. The design of example WSHHC 1500 also insures fast response time with minimal pre-heating required. Example WSHHC 1500 may generate steam instantaneously once small amount of water is supplied to it, while heating 360 ml of water from 20° C. to 95° C. at sea level elevation generally takes less than 100 seconds. Typically, two different devices are required to generate steam and hot water.

The body of example WSHHC 1500 includes two major parts: (a) a cylindrical tank 1510 with a closed end and an open end, and (b) a cap 1520 configured to be mounted on, attached to, assembled to or otherwise coupled to the open end of tank 1510. Either or both of tank 1510 and cap 1520 may be made of aluminum, stainless steel, ceramic, brass, copper, or any combination thereof. Other materials such as carbon-fiber composite and aluminum ceramic composite are also possible materials for either or both of tank 1510 and cap 1520.

In some embodiments, tank 1510 and cap 1520 may be machined using computer numeric controlled (CNC) machining process from solid billet of raw material, then the parts may be held together with eight high strength fasteners. This construction method increases the overall strength and integrity of the unit to withstand the pressure generated by heated steam up to positive pressure of 150 psi/10.3 bar for square inch, psi, the normal operation range of example WSHHC 1500 is −7.0 psi/−0.5 bar to +30.0 psi/2.0 bar. In contrast, traditional heating tank or heating chambers are generally made of metal sheet stock that are welded together to form a cylindrical tank. Due to the nature of welding process, material around the welds could be weakened if the welding process isn't done properly.

In some embodiments, on the cylindrical tank 1510 and the cap 1520 there are a number of ports 1540a-1540e. These ports 1540a-1540e are for water intake into the tank 1510, for water to exit from the tank 1510, for steam to exit from the tank 1510, and for mounting of sensors and heating elements.

The cylindrical tank 1510 has a chamber within a chamber design. In some embodiments, the cylindrical tank 1510 of example WSHHC 1500 may have a main chamber 1512 and an upper chamber 1514 which is smaller than the main chamber 1512. The upper chamber 1514 may be disposed on the upper portion of the main chamber 1512. There may be two open slots on sides of the upper chamber 1514 that are open to the main chamber 1512. The slots are configured to allow water to flow from the smaller upper chamber 1514 to the main chamber 1512 below.

In some embodiments, example WSHHC 1500 may include first and second heating elements 1530a and 1530b. The first heating element 1530a may be placed inside the upper chamber 1514, and the second heating element 1530b may be placed inside of the main chamber 1512.

Water enters into the main chamber 1512 from the port 1540a near the top of the tank 1510. The position of the port 1540a is above the first heating element 1530a. In between the port 1540a and the first heating element 1530a is a splash shield 1550 configured to dispense water evenly into the upper chamber 1514 and the first heating element 1530a within the upper chamber 1514. When water in the upper chamber 1514 raises to the level of the two slots, water will begin to cascade down to the main chamber 1512 below. The primary purpose of the upper chamber 1514 is to generate steam, thus the volume of water that could be held in the upper chamber 1514 is low as low volume of water allows this design to generate steam quickly. With the open-slot design, the entire tank 1510 may be utilized for steam storage, not just limited to the small volume of the upper chamber 1514. A secondary purpose of the upper chamber 1514 is to preheat the water before it enters into the main chamber 1512. This is accomplished by controlling the amount of water entering into the tank 1510 and the amount of electric current that is supplied to the heating element 1530a in the upper chamber 1514. In some embodiments, the amount of the electrical current going into the heating element 1530a and the amount of water may be varied to generate steam while preheating the water that is overflowing from the upper chamber 1514 to the main chamber 1512. This is controlled, for example, via the processing unit 170 of example apparatus 100.

There are three safety features built into example WSHHC 1500. The first feature is a mechanical pressure relief valve 1570. The pressure relief valve 1570 will open at a preset pressure. By opening the pressure relief valve 1570 the pressure within the tank 1510 will equalize with surrounding atmospheric pressure. In some embodiments, the preset pressure for the pressure relief valve 1570 to open may be in the range of 5 psi to 90 psi. In some embodiments, the pressure relief value may be set to be between 20 psi and 40 psi. The second safety feature is a temperature-based electrical kill-switch 1580. This is an electric-mechanical solution. This safety feature constantly measures the internal temperature of the tank 1510. When the temperature reaches a preset temperature the electrical kill-switch 1580 will cut the power off to the heating elements 1530a and 1530b. In some embodiments, the operation range for the temperature-based electrical kill-switch 1580 is between 60° C. to 250° C. In some embodiments, the preset temperature may be in the range of 99° C. to 150° C. The third safety feature utilizes sensor-based electronic temperature sensors 1590 and water level sensors 1560, which is an all-electrical system. The processing unit 170 monitors the electronic temperature sensors 1590 and water level sensors 1560 within the tank 1510. When the water level or temperature parameters are outside of the normal operating range, the processing unit 170 will cut off the power to the heating elements 1530*a* and 1530*b*. The three safety features are monitored by the processing unit 170 but operate independently and do not rely on one single system or part, thus create a system with triple redundancy of safety features. Typical water heating or steam generation tanks do not have this level of triple redundant safety features.

Example Infusion Chamber

FIGS. 21-24 show various views of an example infusion chamber 2100 of an apparatus capable of a multi-course infusion method for tea brewing in accordance with an embodiment of the present disclosure. For example, example infusion chamber 2100 may the infusion chamber 110 of example apparatus 100 as shown in FIGS. 1-12.

Example infusion chamber may include three major components, including container 2110, shaft 2120, and base 2130.

The container 2110 may be of a two-layer design, with an inner layer 2112 and an outer layer 2114, and construction with a food-safe material on the inner layer 2112 where infusion actually takes place. In some embodiments, borosilicate glass or polypropylene plastic may be used if optical clarity is desired. Other food-safe material such as treated aluminum, copper, stainless steel and ceramic may also be feasible as material for the inner layer 2112. The same materials may be used for the outer layer 2114 as well. Since the outer layer 2114 will not be in contact with food, alternative material such as thermoplastic, for example polycarbonate, may be used. In some embodiments, food-safe borosilicate glass may be used for inner layer 2112, with polycarbonate or polypropylene used for the outer layer 2114.

The two-layer design provides insulation. It also reduces temperature fluctuation due to temperature difference between the content of container 2110 and the surrounding atmosphere. The two-layer design also reduces the temperature of the outer layer 2114 for handling by user when the content inside is at a high temperature not suitable for handling with bare hand.

The design of example infusion chamber 2100 is impact resistant and food safe. As example infusion chamber 2100 will be handled by users during usage, the outer layer 2114 made of thermoplastic material will provide the impact resistance that it will encounter in typical handling during usage. Borosilicate glass or comparable material may be used for the inner layer 2112, as it also has high impact resistance and thermo-shock resistance compare to typical glass. At the same time this material is food safe.

The two-layer design of container 2110 provides some optical magnifications, and this increases the visual appeal of the content inside. The spherical shape of container 2110 promotes even circulation and distribution of the content. In some embodiments, the two layers of container 2110 are joined at the base by a collar.

The shaft 2120 and the base 2130 of example infusion chamber 2100 may be made of multiple parts. In some embodiments, part of the base 2130 may be connected with the shaft 2120 due to ease of fabrication. Given that shaft 2120 and base 2130 have distinctive functions, they will be described separately.

Shaft 2120 may be of a dual shaft design, with a hollow inner shaft nested within a larger exterior shaft. The dual shaft design allows shaft 2120 to have two independent passages to move two different materials in and out of example infusion chamber 2100. For example, one passage may move air out of example infusion chamber 2100, while the other passage may move liquid or steam into example infusion chamber 2100.

In some embodiments, shaft 2120 may include a mushroom cap 2122 on the top of the inner shaft. This is to prevent condensation that might form on to the shaft from being drawn into shaft 2120. Typically the shaft 2120 is used to draw air out of example infusion chamber 2100.

Additionally or alternatively, shaft 2120 may include an umbrella cap 2124 at the top of the outer shaft. This feature is configured to dispense liquid evenly in a downward and out fashion. Liquid, e.g., water, typically enters into example infusion chamber 2100 through this passage (via umbrella cap 2124).

In some embodiments, shaft 2120 may be made of ceramic, stainless steel, aluminum, or thermoplastic. A variety of coating process may be utilized to further improve the visual appeal and durability of shaft 2120 for food service. Example of these coating processes may include, for example, hard anodizing, plasma oxidation process, gold plating, silver plating, and particle vapor deposition process.

The placement of shaft 2120 in the middle of the container 2110 also facilitates even circulation of water and content suspended in water when air is drawn into the container 2110 from the base 2130.

In some embodiments, the base 2130 may include two screens, screen a 2132 and screen B 2134, with orifices on them. The orifices on the screen A 2132 may be of 0.75 mm to 1.5 mm in diameter. Exact dimensions of the orifices depend on the median used for infusion. These orifices function as screens so only air, liquid and suspended solids within the liquid smaller than the orifices size may pass through and out of example infusion chamber 2100. Orifices on screen B 2134 may be of 0.65 mm to 0.25 mm in diameter. This screen functions as a water barrier, and may allow air to freely flow in and out while preventing water from freely flowing freely through under normal atmospheric pressure due to surface tension of water. Only when pressure is applied will water flow through screen B 2134. The infused beverage will have surface tension properties similar to those of water so this design will work for water and resulting beverage after infusion process.

Highlights of Example Apparatus

In view of the above, an apparatus (e.g., example apparatus 100) capable of multi-course infusion for brewing tea and other beverages may include: an infusion chamber, a water steam hybrid heating chamber (WSHHC), one or more carafes, and a processing unit. The infusion chamber may be configured to receive an amount of beverage medium, steam and hot water therein to infuse the beverage medium in the hot water to form a beverage. The WSHHC may be configured to heat a liquid therein to provide steam and hot water. The one or more carafes may be configured to receive the beverage from the infusion chamber. The processing unit may be coupled to control at least the infusion chamber and the WSHHC to perform a number of operations. The operations performed by the processing unit may include: providing steam from the WSHHC into the infusion chamber to pre-condition the beverage medium; and performing multi-course infusion of the beverage medium in hot water. The processing unit may perform the multi-course infusion by repeating more than once the following: initiating a respective course of infusion by showering a respective amount of hot water at a respective temperature down onto the beverage medium in the infusion chamber; infusing the beverage medium in the respective amount of hot water for a respective duration of infusion time to form the beverage; providing steam into the infusion chamber while the beverage medium is infused in the hot water; drawing the beverage from the infusion chamber into the one or more carafes after the respective duration of infusion time has elapsed; and optionally resting the beverage medium in the infusion chamber for a respective duration of resting time.

In some embodiments, the processing unit may be configured to provide different amounts of hot water at different temperatures and infuse the beverage medium in the hot water for different durations of time for different courses of infusion according to one or more recipes.

In some embodiments, the one or more recipes may include a first recipe and a second recipe. The first recipe may be formed by a user during operation of the apparatus. The second recipe may be downloaded from an external device. In some embodiments, a given recipe may evolve based on a user's usage history. For example, a user may choose to start/formulate a recipe anew, use an existing recipe without changing the recipe, or use an existing recipe and update the recipe by modifying one or more aspects (e.g., time, temperature, etc.) of the recipe. The apparatus is capable of recording a new recipe when the user starts/formulates the new recipe. The apparatus can store a number of recipes, whether formulated by the user or downloaded/received from one or more external sources, for the user to choose from and utilize. The apparatus is also capable of recording any modification to an existing recipe by the user to continuously update the recipe based on the usage history of the user or, alternatively, store the modified recipe as a new recipe. Thus, a given recipe for a given beverage medium may evolve based on the user's usage history.

In some embodiments, the infusion chamber may include a container, a shaft and a base. The container may include an inner layer and an outer layer joined at the base by a collar. The shaft may include an inner shaft nested within an exterior shaft, with the inner shaft having a mushroom cap at a distal end thereof and the outer shaft having an umbrella cap at a distal end thereof. The base may include one or more screens with one or more orifices thereon to allow air, liquid and suspended solids smaller than a size of the one or more orifices to flow in and out of the infusion chamber.

In some embodiments, the WSHHC may include a tank and at least one heating element. The tank may include an upper chamber and a main chamber with one or more slots on the upper chamber to allow a liquid to flow from the upper chamber to the main chamber. The at least one heating element may be configured to heat the liquid in the upper chamber.

In some embodiments, the WSHHC may further include: a pressure relief valve configured to open at a preset pressure to equalize a pressure in the WSHHC with an atmospheric pressure; a temperature-based electrical kill-switch configured to measure an internal temperature of the WSHHC and cut off power to the at least one heating element in response to the internal temperature reaching a preset temperature; and a plurality of sensors coupled to the processing unit and configured to measure at least a level of liquid in the WSHHC such that the processing unit is configured to cut off power to the at least one heating element in response to the level of liquid exceeding an preset level.

In some embodiments, the at least one of the one or more carafes may include an internal heating element configured to operate via magnetic resonance heating.

In some embodiments, the apparatus may further include a network communication unit coupled to and controlled by the processing unit such that, via the network communication unit, the processing unit is configured to communicate with one or more communicating devices to receive and provide one or more recipes of brewing one or more types of beverage. For example, the network communication unit may be configured to communicate with the one or more communication devices, which are separate from the apparatus, via a wireless mechanism, a wired communication mechanism, or a combination of wireless and wired communication mechanisms.

In some embodiments, the apparatus may further include a user interface unit coupled to and controlled by the processing unit such that, via the user interface unit, the processing unit is configured to provide information to a user and receive one or more user commands from the user.

In some embodiments, the user interface unit may include a touch-sensing display panel, a microphone, a speaker, or a combination thereof.

In some embodiments, the apparatus may be configured to receive commands from and controlled by a smartphone, tablet or similar devices with Bluetooth and/or Wi-Fi capabilities.

In some embodiments, the apparatus may upload the usage history to a central server that analyzes the usage history to provide a new recipe recommendation to the user.

In some embodiments, the apparatus may upload the usage history to a central server that analyzes the usage history to provide a new tea recommendation to the user.

Figure 25:
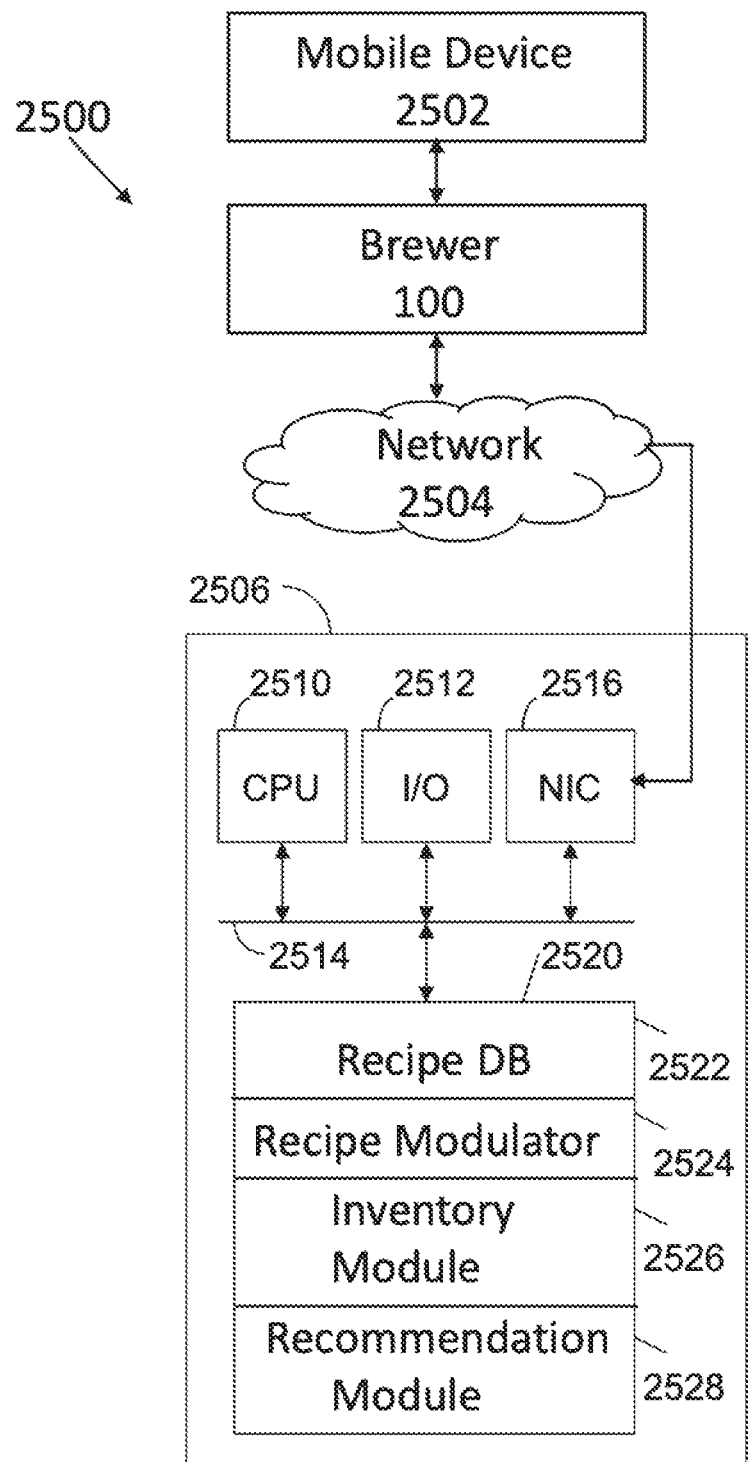
FIG. 25 illustrates a system configured in accordance with an embodiment of the invention.

FIG. 25 illustrates the disclosed apparatus 100 (i.e., brewer or brewing machine) forming a part of a larger system 2500. In one embodiment, the brewer 100 is in wireless communication with a mobile device 2502 (e.g., a mobile telephone, tablet, wearable device and the like). The mobile device 2502 executes a beverage consumption application. The beverage consumption application may directly access network 2504 to access server 2506. Alternately or in addition, the beverage consumption application may communicate with server 2506 via brewer 100 and network 2504. The beverage consumption application coordinates and tracks beverage consumption activity. For example, the beverage consumption application may prompt a user to specify the type of infusible material to be processed by the brewer. The beverage consumption application may prompt the user for general preferences in a beverage (e.g., sweet, floral, savory, nutty, smoky, weak caffeine, strong caffeine). The beverage consumption application may also prompt the user for user specific preferences for a given recipe. The mobile device 2502 may also be used to inform the server 2506 of the location of the brewer 100. Operations executed by the mobile device 2502 may be offloaded to the server 2506. Thus, for example, the brewer may be configured with a touch screen that operates as a substitute for the mobile device 2502. In such a configuration, processing tasks may be split between the brewer 100 and the server 2506.

The server 2506 includes standard components, such as a central processing unit 2510 connected to input/output devices 2512 via a bus 2514. The input/output devices 2512 may include a keyboard, mouse, touch display and the like. A network interface circuit 2516 is also connected to the bus 2514. The network interface circuit 2516 provides connectivity to network 2504. A memory 2520 is also connected to the bus 2514. The memory stores instructions executed by the central processing unit 2510 to implement operations of the invention.

The memory maintains a recipe database 2522. FIG. 26 illustrates exemplary schema for the recipe database. The database schema includes at least one genus characterization of an infusible material (e.g., black tea, green tea, tisane, herbal infusion, etc.). Each genus has an associated set of species within the genus characterization. Thus, FIG. 26 shows Genus_1 (with species_1 through species_N) through Genus_N (with species_1 through species_N).

FIG. 26 also illustrates that a species has an associated recipe. Each recipe specifies a set of infusible material course treatments. Each infusible material course treatment includes at least one set of fluid agitation parameters, at least one wait interval, at least one set of liquid injection parameters and a release parameter.

In the example of FIG. 26, Course_1 has fluid agitation parameters, a first wait interval, liquid injection parameters, a second wait interval and a release parameter. Course_N has a similar configuration, but the liquid injection parameters are processed before the fluid agitation parameters.

Fluid agitation parameters specify a fluid type ranging from air to steam, a fluid temperature and a fluid injection time period. The liquid injection parameters specify a liquid type, a liquid temperature and a liquid injection time period (or volume). The release parameter specifies how long the valve of the infusion chamber should be opened to vacate the infusion chamber of liquid. The release parameter is computed as a function of the physical characteristics of the infusible material and the characteristics of the infusible material course treatments.

The recipe may also include metadata. For example, the metadata may specify a recipe name and recipe author, such as a brewing expert. The metadata may also include a recipe user and/or a count of recipe users. The metadata may also include one or more recipe endorsements. Recipe ratings may also be provided. The metadata may also be used to control recipe availability. A user may want to maintain a recipe as a secret. Alternately, a user may want to limit distribution to a social network. Alternately, a user may want to make a recipe publicly available.

Those of skill in the art will appreciate that the genus/species database schema allows the system to map an uncharacterized substance to a known knowledge base. For example, a hierarchal ordered set of attributes about a beverage base material may be maintained. This is used to determine the proper infusion technique to administer to produce the intended beverage. If a foreign beverage base material is used that the infuser has not seen before it can use what it knows about infusing related base material (e.g., a nearby species) to make a best guess at infusing the current material.

Figure 27:
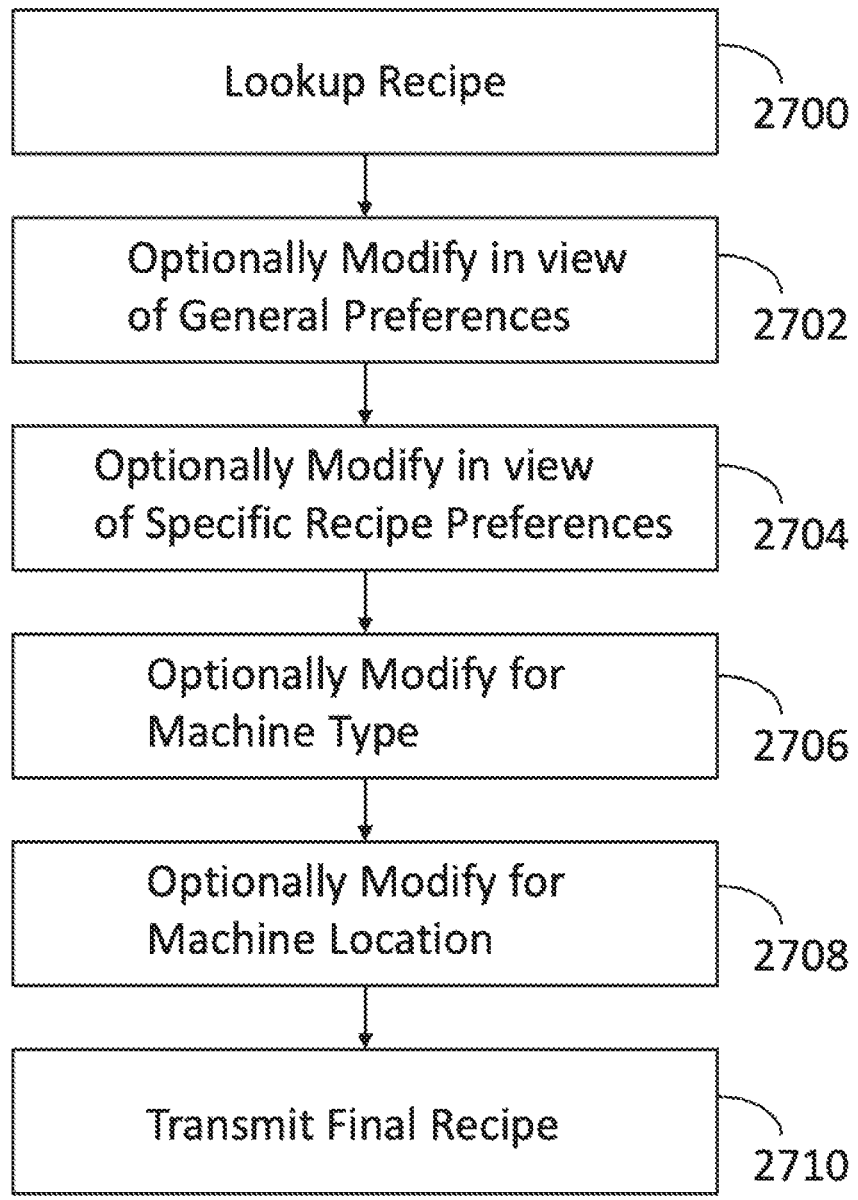
FIG. 27 illustrates processing operations associated with an embodiment of the invention.

Returning to FIG. 25, the memory 2520 also stores a recipe modulator 2524. Operations associated with the recipe modulator 2524 are illustrated in FIG. 27. Initially, recipe is looked up 2700. The recipe is optionally modified in view of general preferences 2702. For example, general preferences, such as aroma, flavor and/or compounds can be applied dynamically and with improving efficacy for each type of beverage. Brew options modify the base line recipe and allow for the desired flavors or chemical compounds to be more or less pronounced in the completed beverage. Using both direct and indirect feedback from the user base the system tests and identifies options for the best results and then promotes the more successful options across the broader system ensuring that there are better results in the execution of the recipe in concert with the brew options that tweak the recipe.

Automatic recipe customization may be based on explicit and/or implicit preferences based on consumer-supplied settings and observed usage. For example, it may be determined that it is desirable to diminish caffeine after 4 pm. Beverage infusion system recipe customization may be based on taste (sweet, floral, savory, etc.) and aroma (nutty, vegetal, smoky, etc.) preferences as well as chemical compound levels (e.g. caffeine and antioxidants) and the user's explicit settings for these. The user is given control through a touch screen interface on the mobile device 2502. The interface allows the user to select the types of flavors or aromas that the user prefers and they wish to highlight. The recipe modulator 2524 adjusts the brewing characteristics to highlight or suppress the flavors or aromas specified by the user.

The recipe is optionally modified in view of user specific preferences for a recipe 2704. The user's taste preferences for specific types of drinks or specific compounds in the beverages are contemplated by the machine in the context of the user's current context or situation and the machine creates the most appropriate beverage possible without direct input from the user.

The recipe is optionally modified for machine type 2706. That is, the recipe may be optionally modified for the specific machine target (e.g., plumbing characteristics, heat perdition, volume capabilities, flow capabilities, and machine jurisdiction, location and altitude etc.) to tailor an optimized machine recipe.

The recipe is optionally modified for machine location 2708. The machine location modification may be based upon the fact that the machine is at a high altitude. The machine location may also be used to modify a recipe. For example, in the Southern part of the U.S. a recipe may be modified to be sweeter to accommodate local preferences, whereas in Japan the recipe may be modified to be more savory to accommodate local preferences.

In one embodiment, a scheduled beverage is not created if no one is occupying the dwelling. Brewing may be initiated upon an individual entering a dwelling. One or more sensors in the house or on the brewer 100 may be used to support this functionality.

Finally, the final recipe is transmitted 2710. Thus, the server 2506 facilitates the creation, storage and transmission of a recipe to a remote beverage infusion system for execution of operation parameters to produce a beverage to be consumed by a user. For example, an expert creates a recipe for infusing tea by detailing a set of parameters for the beverage infusion system. The parameters may include but are not limited to infusion duration, liquid volume, liquid temperature, infusion of steam, infusion of air, and collecting multiple infusions. The parameters are then saved and digitally transmitted to the end consumer. The parameters are then interpreted by the beverage infusion system.

Sharing and modification of a recipe for a beverage infusion system by multiple users is also supported. For example, a set of portable or saved parameters for a specific type of tea infusion may be modified by a consumer. The new recipe can then be sent or shared with another consumer for use by another beverage infusion system.

Memory 2520 also stores an inventory module 2526. In one embodiment, the inventory module 2526 provides statistics on user beverage consumption. The statistics may be evaluated by a user or a third-party. For example, a seller may be given access to usage information. The inventory information allows the seller to make manual or automated decisions about what inventory is need to meet demand by the customer.

The inventory module 2526 may also be used to establish a discount for a beverage based on known inventory of a consumer and saved preferences. For example, the inventory module 2526 maintains beverage consumption data and determines that inventory levels of a preferred beverage base material for the user are low. A coupon or discount may be sent to the user to allow them to purchase preferred or similar-to-preferred beverage base material.

In another embodiment, the inventory module 2526 provides beverage recommendations based upon user beverage consumption. In another embodiment, the inventory module is used to coordinate supply-side inventory. That is, the inventory module 2526 may also be used to record beverage consumption data and determine optimal inventory levels of beverage base materials. These inventory levels are then interpreted to determine what inventory is needed to satisfy potential consumer demand.

The inventory module 2526 may monitor flow of water through the filter of the beverage machine to predictively deliver replacement filters at the optimal time. That is, the inventory module 2526 monitors flow of water through the water filter to understand flow rate and filter performance. This allows it to understand past performance as well as performance in relation to other users in the same region and other regions to know when the filter should be replaced to ensure optimal water quality for the beverages created by the tea maker.

The memory 2520 also stores a recommendation module 2528, which may be used to selectively supply beverage recommendations. For example, a recommendation may be based on evaluating taste composition attributes of previous consumption behavior by the beverage infusion system. More particularly, the infusion system records what beverages are made and how often they are made. The recommendation module 2528 interprets this data with other data to make a determination about what other types of beverages the customer using the infusion system would likely enjoy. These other beverages are then presented to the user as a recommendation, for example on the user's mobile device 2502.

Figure 28:
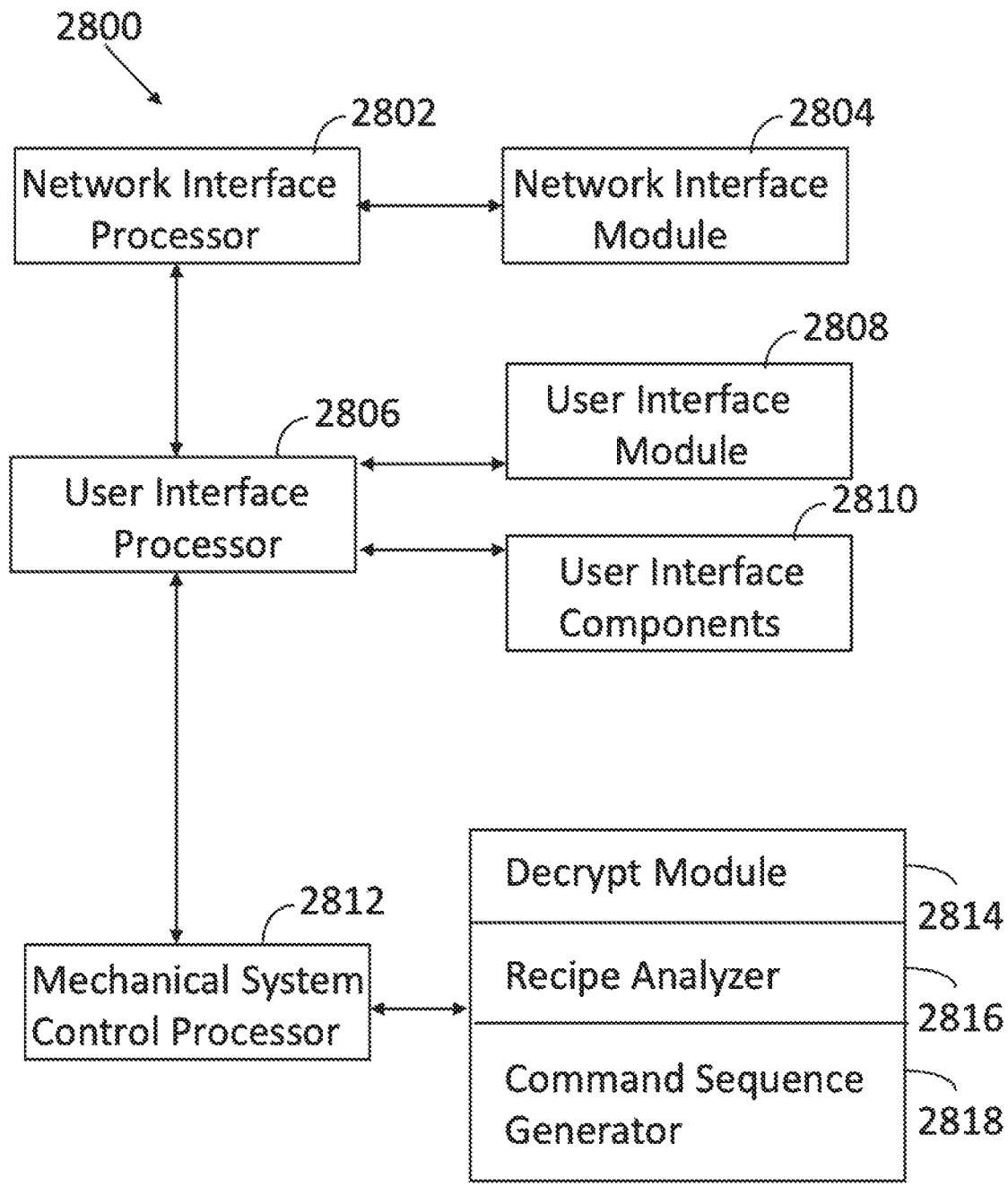
FIG. 28 illustrates electronic components associated with the disclosed brewer.

FIG. 28 illustrates electronic components 2800 associated with an embodiment of the brewer 100. A network interface processor 2802 executes a software based network interface module 2804 to provide connectivity to network 2504. The network interface processor 2802 is connected to a user interface processor 2806. The user interface processor 2806 executes a software based user interface module 2808 to control user interface components 2810 (e.g., a display, LEDs, a speaker) associated with the brewer 100.

The user interface processor 2806 is in communication with a mechanical system processor 2812. The mechanical system processor is configured to execute a recipe specifying infusible material course treatments. The mechanical system control processor 2812 executes a decrypt module 2814 to decrypt an encrypted version of a recipe. The processor 2812 also executes a recipe analyzer to identify and override dangerous brewing machine operation commands (e.g., boil water for an excessive period of time, inject an excessive amount of steam, etc.). Thus, the recipe analyzer 2816 enforces operating parameters that are known to be safe for a given machine.

The processor 2812 also derives a mechanical system command sequence from the recipe. The mechanical system command sequence specifies control of at least one pump, at least one valve and at least one heater of the type disclosed in the previously discussed figures.

ADDITIONAL NOTES AND CONCLUSION

Even though numerous characteristics and advantages of the present disclosure have been set forth in the foregoing description, together with details of the structure and function of the present disclosure, the disclosure is illustrative only, and changes may be made in detail, especially in matters of shape, size, and arrangement of parts within the principles of the present disclosure to the full extent indicated by the broad general meaning of the terms in which the appended claims are expressed.

What is claimed is:
1. A brewing system comprising:
server having
a processor; and
a memory connected to the processor, the memory storing instructions executed by the processor to:
maintain a recipe database including a genus characterization of an infusible material and a plurality of species of infusible materials within the genus characterization, wherein each species of infusible material has an associated recipe specifying a plurality of infusible material course treatments, wherein each infusible material course treatment includes at least one set of fluid agitation parameters, at least one wait interval, at least one set of liquid injection parameters and a release parameter;
wherein the instructions stored on the memory are transmitted to a brewing apparatus through a network interface circuit for brewing a beverage, the brewing apparatus comprising:
an infusion chamber including a base to support a beverage medium and a shaft rising above the base, wherein the base has water steam inflow apertures and the top of the shaft has apertures for water to flow into the infusion chamber;
a heating chamber configured to provide steam and hot water, the heating chamber in fluid communication with an inlet of the infusion chamber;
at least one air/water variable valve located between and in fluid communication with the infusion chamber and the heating chamber;
a carafe in fluid communication with an outlet of the infusion chamber;
at least one valve located between and in fluid communication with die infusion chamber and the carafe; and
a processing unit configured to control the heating chamber and at the at least one valve according to the instructions received from the server, wherein the steam and the hot water are provided to the inlet of the infusion chamber through the at least one air/water variable valve and a beverage from the infusion chamber is provided to the carafe through the valve located between the infusion chamber and the carafe in response to the instructions received from the server.

2. The server of claim 1 wherein the at least one set of fluid agitation parameters specify a fluid type ranging from air to steam, a fluid temperature and a fluid injection time period.

3. The server of claim 1 wherein the at least one set of liquid injection parameters specify a liquid type; a liquid temperature and a liquid injection time period.

4. The server of claim 1 wherein the release parameter is computed as a function of physical characteristics of the infusible material and the characteristics of the plurality of infusible material course treatments.

5. The server of claim 1 wherein the recipe includes recipe metadata with information selected from recipe author, recipe user, recipe endorsement, recipe availability and recipe rating.

6. The server of claim 1 wherein the memory stores the instructions executed by the processor to maintain a recipe modulator to dynamically alter a recipe in view of general user preferences.

7. The server of claim 1 wherein the memory stores the instructions executed by the processor to maintain a recipe modulator to dynamically alter a recipe in view of user specific preferences for a recipe.

8. The sever of claim 1 wherein the memory stores the instructions executed by the processor to maintain a recipe modulator to dynamically alter a recipe in view of brewing apparatus type.

9. The server of claim 1 wherein the memory stores the instructions executed by the processor to maintain a recipe modulator to dynamically alter a recipe in view of a brewing apparatus location.

10. The server of claim 1 wherein the memory stores the instructions executed by the processor to maintain an inventory module to provide statistics on a user beverage consumption.

11. The server of claim 1 wherein the memory stores the instructions executed by the processor to maintain an inventory module to provide beverage recommendations based upon a user beverage consumption.

12. The server of claim 1 wherein the memory stores thy; instructions executed by the processor to maintain an inventory module to coordinate supply-side inventory.

13. The server of claim 1 wherein the memory stores the instructions executed by the processor to maintain a recommendation module to selectively supply beverage recommendations.

14. The server of claim 1 in network communication with a brewing machine and a mobile device executing a beverage consumption application.

* * * * *